US008341730B2

(12) United States Patent
Hibino et al.

(10) Patent No.: US 8,341,730 B2

(45) Date of Patent: Dec. 25, 2012

(54) IMAGE FORMING APPARATUS AND COMPUTER-READABLE STORAGE MEDIUM FOR COMPUTER PROGRAM

(75) Inventors: Takeshi Hibino, Toyokawa (JP); Kenichi Sawada, Toyohashi (JP); Takuya Okada, Toyokawa (JP); Atsushi Tomita, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 307 days.

(21) Appl. No.: 12/816,845

(22) Filed: Jun. 16, 2010

(65) Prior Publication Data

US 2010/0325177 A1 Dec. 23, 2010

(30) Foreign Application Priority Data

Jun. 17, 2009 (JP) ................................ 2009-144626

(51) Int. Cl.
*G06F 21/00* (2006.01)

(52) U.S. Cl. ................................ 726/17; 726/8; 726/28

(58) Field of Classification Search .................... 726/17, 726/8, 28

See application file for complete search history.

(56) References Cited

U.S. PATENT DOCUMENTS

| | | | | |
|---|---|---|---|---|
| 7,725,924 | B2 | 5/2010 | Terao | |
| 2004/0030986 | A1 | 2/2004 | Matsuda | |
| 2006/0064741 | A1* | 3/2006 | Terao | 726/4 |
| 2009/0077656 | A1 | 3/2009 | Oka et al. | |
| 2009/0217360 | A1* | 8/2009 | Tsuchiya et al. | 726/5 |

FOREIGN PATENT DOCUMENTS

| | | |
|---|---|---|
| JP | 2003-195704 A | 7/2003 |
| JP | 2003-323093 A | 11/2003 |
| JP | 2006-085641 | 3/2006 |
| JP | 2009-071834 | 4/2009 |

OTHER PUBLICATIONS

Hwang, "Web services and role selection in support of separation of duties and binding of duties for composable process execution", Service-Oriented Computing and Applications (SOCA), 2009 IEEE International Conference Jan. 14-15, 2009, pp. 1-8.*

Office Action (Notification of Reason(s) for Refusal) dated May 10, 2011, issued in the corresponding Japanese Patent Application No. 2009-144626, and an English Translation thereof.

* cited by examiner

*Primary Examiner* — Kambiz Zand
*Assistant Examiner* — Michael Guirguis
(74) *Attorney, Agent, or Firm* — Buchanan Ingersoll & Rooney PC

(57) ABSTRACT

An image forming apparatus is provided with a user authentication portion performing a user authentication process on a user by using user authentication information, a section authentication portion performing a section authentication process, by using one of a plurality of pieces of section authentication information, on the user who has been successfully authenticated by the user authentication portion, an associated information storage portion storing, therein, associated information in which the user authentication information is associated with the plurality of pieces of section authentication information, and a selection process portion selecting, after the user has been successfully authenticated by the user authentication portion, at least one of the plurality of pieces of section authentication information satisfying a preset condition from among the plurality of pieces of section authentication information associated with the user authentication information that has been used for the user authentication process.

24 Claims, 32 Drawing Sheets

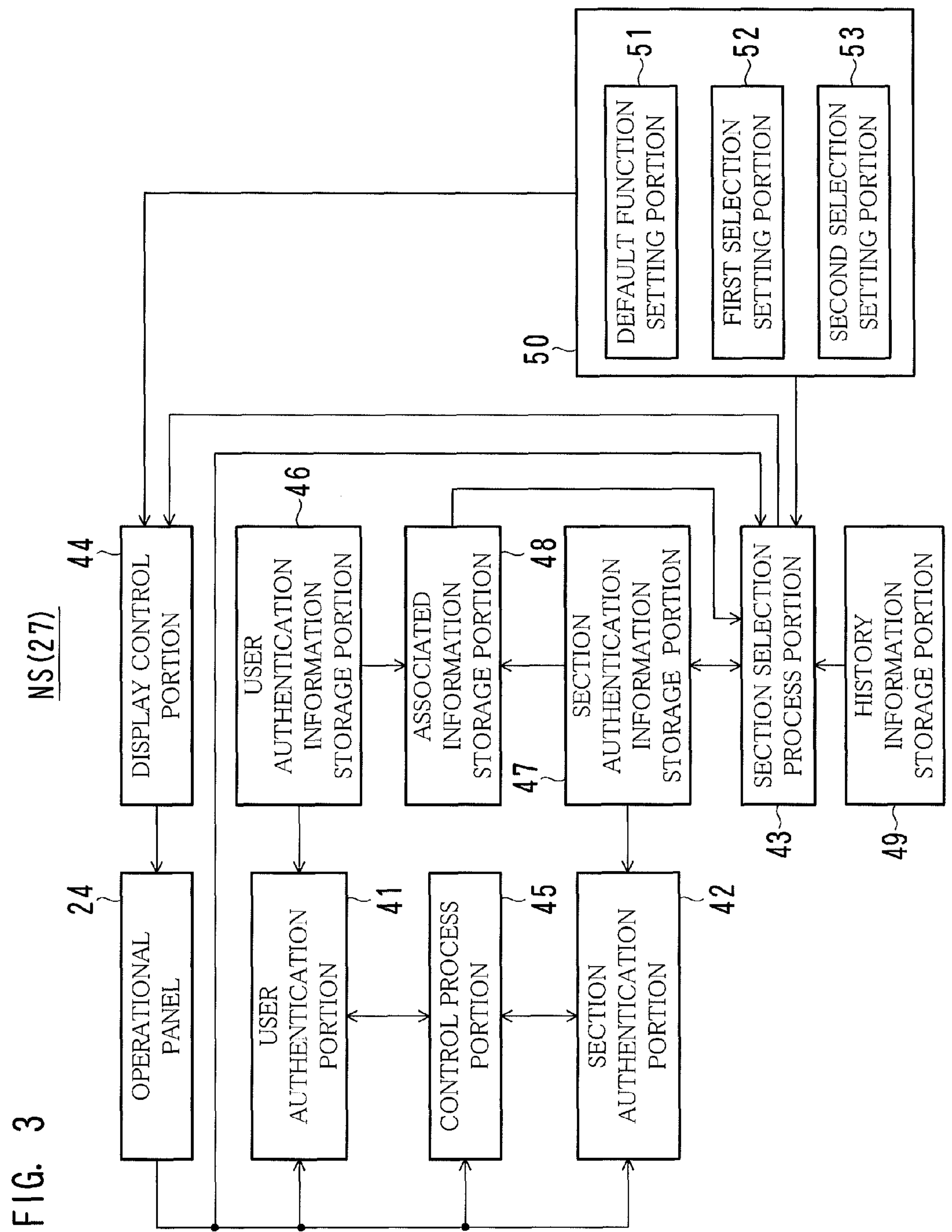
FIG. 3
NS(27)
24
OPERATIONAL PANEL
44
DISPLAY CONTROL PORTION
USER AUTHENTICATION PORTION
41
46
USER AUTHENTICATION INFORMATION STORAGE PORTION
CONTROL PROCESS PORTION
45
ASSOCIATED INFORMATION STORAGE PORTION
48
SECTION AUTHENTICATION PORTION
42
SECTION AUTHENTICATION INFORMATION STORAGE PORTION
47
SECTION SELECTION PROCESS PORTION
43
HISTORY INFORMATION STORAGE PORTION
49
50
DEFAULT FUNCTION SETTING PORTION
51
FIRST SELECTION SETTING PORTION
52
SECOND SELECTION SETTING PORTION
53

BNJ
BBG
SECTION NUMBER
BNM
SECTION NAME
BPW
PASSWORD
BKS
FUNCTION RESTRICTION
BCJ
COUNT UPPER LIMIT
TRB
REGISTRATION DATE

UID KN BBG(BNJ)

| USER ID | FUNCTION | SECTION NUMBER |
|---|---|---|
| U001 | COPY | 1 |
| | | 2 |
| | | 3 |
| | FAX | 1 |
| | | 2 |
| U002 | COPY | 1 |
| | | 2 |
| | FAX | 1 |
| | | 2 |
| | | 3 |
| U003 | COPY | 1 |
| | | 2 |
| | | 3 |
| | FAX | 1 |
| | | 2 |
| | | 3 |
| ⋮ | ⋮ | ⋮ |

FIG. 8A
LR1
USER:U001
| DATE | FUNCTION | SECTION |
|---|---|---|
| 2008/9/24 | COPY | 1 |
| 2008/9/23 | COPY | 1 |
| 2008/9/20 | COPY | 3 |
| 2008/9/20 | FAX | 2 |
| 2008/9/20 | COPY | 1 |
| 2008/9/14 | COPY | 1 |
| 2008/9/10 | FAX | 2 |
| 2008/9/8 | FAX | 2 |
| 2008/9/6 | COPY | 1 |
| 2008/9/6 | COPY | 3 |
| 2008/9/3 | COPY | 1 |
| 2008/8/29 | COPY | 1 |
| 2008/8/27 | COPY | 1 |
| 2008/8/23 | COPY | 1 |
| 2008/8/17 | FAX | 2 |
| 2008/8/10 | COPY | 1 |
| 2008/8/10 | FAX | 2 |
| 2008/8/9 | COPY | 2 |
| 2008/8/5 | FAX | 2 |
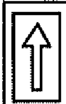
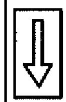

USER:U002

NJ KN BBG

| DATE | FUNCTION | SECTION |
| --- | --- | --- |
| 2008/9/20 | COPY | 1 |
| 2008/9/20 | FAX | 3 |
| 2008/9/15 | FAX | 3 |
| 2008/9/13 | FAX | 2 |
| 2008/8/29 | COPY | 1 |
| 2008/8/27 | COPY | 1 |
| 2008/8/25 | FAX | 3 |
| 2008/8/18 | FAX | 2 |
| 2008/8/15 | FAX | 3 |
| 2008/8/3 | FAX | 3 |
| 2008/7/29 | FAX | 1 |
| 2008/7/24 | COPY | 1 |
| 2008/7/23 | FAX | 3 |
| 2008/7/20 | COPY | 1 |
| 2008/7/18 | FAX | 2 |
| 2008/7/11 | FAX | 3 |
| 2008/7/10 | FAX | 2 |
| 2008/7/4 | COPY | 2 |
| 2008/7/3 | FAX | 3 |

USER:U003

NJ KN BBG

| DATE | FUNCTION | SECTION |
| --- | --- | --- |
| 2008/9/25 | COPY | 1 |
| 2008/9/23 | COPY | 2 |
| 2008/9/23 | FAX | 3 |
| 2008/9/20 | FAX | 2 |
| 2008/9/20 | COPY | 1 |
| 2008/9/14 | COPY | 1 |
| 2008/9/3 | FAX | 2 |
| 2008/8/30 | FAX | 2 |
| 2008/8/25 | COPY | 1 |
| 2008/8/20 | COPY | 3 |
| 2008/8/20 | FAX | 1 |
| 2008/8/15 | COPY | 2 |
| 2008/8/13 | COPY | 1 |
| 2008/8/11 | FAX | 1 |
| 2008/8/10 | FAX | 2 |
| 2008/8/3 | COPY | 1 |
| 2008/8/3 | FAX | 2 |
| 2008/7/25 | COPY | 2 |
| 2008/7/20 | FAX | 2 |

FIG. 11

IMAGE FORMING APPARATUS AND COMPUTER-READABLE STORAGE MEDIUM FOR COMPUTER PROGRAM

This application is based on Japanese patent application No. 2009-144626 filed on Jun. 17, 2009, the contents of which are hereby incorporated by reference.

BACKGROUND OF THE INVENTION

1. Field of the Invention

The present invention relates to an image forming apparatus and a computer-readable storage medium for a computer program.

2. Description of the Related Art

User authentication is widely used in many circumstances due to the recent increase in awareness of security. In an office setting, section authentication (section management) is used in combination with user authentication for the purpose of budget control for each group or each section.

In the case, however, of the combined use of the user authentication and the section authentication in an image forming apparatus, a user needs to be successfully authenticated twice until he/she is permitted to log onto the image forming apparatus, which increases the time for him/her to operate the image forming apparatus.

There is a function, for example, of incorporating, into authentication information on a user (user authentication information), information on a division to which the user belongs (section information) to perform section authentication in combination with user authentication. In order to use the function, operation for registering the section information in the user authentication information is necessary. In general, an administrator carries out such operation. If a user performs such operation by himself/herself, he/she needs to perform such operation on a registration screen. Unfortunately, it is burdensome for the administrator or the user to perform the operation for registering the section information in the user authentication information.

To cope with this, a cooperative function is provided. According to this function, a user is associated (correlated) with a division in advance. Then, if the user is successfully authenticated by user authentication, then he/she is permitted to log onto an image forming apparatus through the division associated with him/her. In the case of using the cooperative function, it is unnecessary for the administrator to operate user authentication information for individual users, and it is possible for the user to log onto the image forming apparatus through the division merely by user authentication.

In connection with this, a control method of an image forming apparatus is proposed in Japanese Laid-open Patent Publication No. 2003-195704. According to the method, fingerprint data of a user is associated with a section number, and is registered in a RAM in advance. Upon the use of the image forming apparatus, a comparison is made between the fingerprint data registered in the RAM and fingerprint data of a user created by reading a fingerprint of the user. In the case where the fingerprint data of the user is verified, the image forming apparatus becomes available according to the section number registered in association with the fingerprint data.

As companies have recently grown and expanded, the number of users and sections (projects) to be managed therein increases accordingly. Further, a user does not always belong to one section, and occasionally belongs to a plurality of sections at the same time.

In the case where a user belongs to a plurality of sections, in order for the user to use an image forming apparatus, it is always necessary to select a section after he/she has undergone a user authentication process. Thus, as the number of sections to which the user belongs increases, for example, indications on the display for showing the sections should be changed from one to another, which complicates operation to select a desired section.

Further, the purposes of using output materials sometimes differ depending on functions, such as a copy function and a facsimile function, equipped in an image forming apparatus. Accordingly, a section to be selected possibly differs according to the functions. In such a case, user authentication is required on a function-by-function basis, which further complicates the operation.

As discussed above, unfortunately, conventional authentication methods involve complicated steps to make an image forming apparatus available.

SUMMARY

The present disclosure is directed to solve the problems pointed out above, and therefore, an object of an embodiment of the present invention is to improve user-friendliness, i.e., to facilitate operation for section authentication even if a user belongs to a plurality of sections.

According to an aspect of the present invention, an image forming apparatus includes a user authentication portion that performs a user authentication process on a user by using user authentication information, a section authentication portion that performs a section authentication process, by using one of a plurality of pieces of section authentication information, on the user who has been successfully authenticated by the user authentication portion, an associated information storage portion that stores, therein, associated information in which the user authentication information is associated with the plurality of pieces of section authentication information, and a selection process portion that selects, after the user has been successfully authenticated by the user authentication portion, at least one of the plurality of pieces of section authentication information satisfying a preset condition from among the plurality of pieces of section authentication information associated with the user authentication information that has been used for the user authentication process.

The selection process portion selects at least one of the plurality of pieces of section authentication information satisfying a preset condition from among the plurality of pieces of section authentication information associated with the user authentication information. This makes it easy for the user to select section authentication information.

These and other characteristics and objects of the present invention will become more apparent by the following descriptions of preferred embodiments with reference to drawings.

BRIEF DESCRIPTION OF THE DRAWINGS

FIG. 3 is a block diagram illustrating an example of the functional configuration of an image forming apparatus.

FIG. 7 is a diagram illustrating an example of associated information.

FIGS. 8A-8C are diagrams illustrating examples of a log-on history.

FIG. 11 is a diagram illustrating an example of a section authentication screen.

DESCRIPTION OF THE PREFERRED EMBODIMENTS

Figure 1:
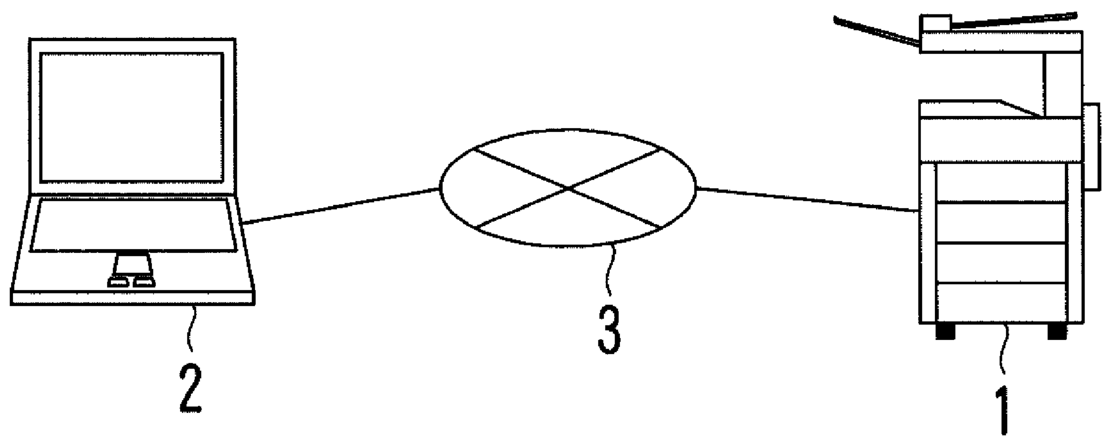
FIG. 1 is a diagram illustrating an example of a network system including an image forming apparatus.

A network system NS illustrated in FIG. 1 is a network system including an image forming apparatus 1 according to an embodiment of the present invention.

Referring to FIG. 1, the network system NS is configured of the image forming apparatus 1, a terminal 2, a communication line 3, and the like. A LAN, the Internet, a public line, a dedicated line, or the like is used as the communication line 3.

The image forming apparatus 1 is configured to integrate, thereinto, a variety of functions, such as copying, network printing, faxing, scanning, and a document server.

Other than the basic functions described above, the image forming apparatus 1 of this embodiment has a user authentication function, a section authentication function, and a section management function. The user authentication function is to determine whether or not a user who attempts to log onto the image forming apparatus 1 is a user that has been registered in advance. The section authentication function is to determine whether or not a user who specifies a section or a group and attempts to log onto the image forming apparatus 1 is authorized to use the image forming apparatus 1 through the specified section. Stated differently, the section authentication function is to determine whether or not a user is permitted to log onto the image forming apparatus 1 through the specified section. In the case where a user is permitted to log onto the image forming apparatus 1 through the specified section, in other words, the section authentication process is successful, the amount is charged to that section for the use of the image forming apparatus 1 by the user.

The section management function is to manage, on a section-by-section basis, information on the amount charged for the use of the various functions provided in the image forming apparatus 1. The section management function is also to manage, for example, users belonging to sections, restrictions of charge imposed on users, permission of cooperative section authentication or lack thereof. Note that examples of the "section" are a division, a group, a project in a variety of organizations or societies, or the organization itself.

Figure 2:
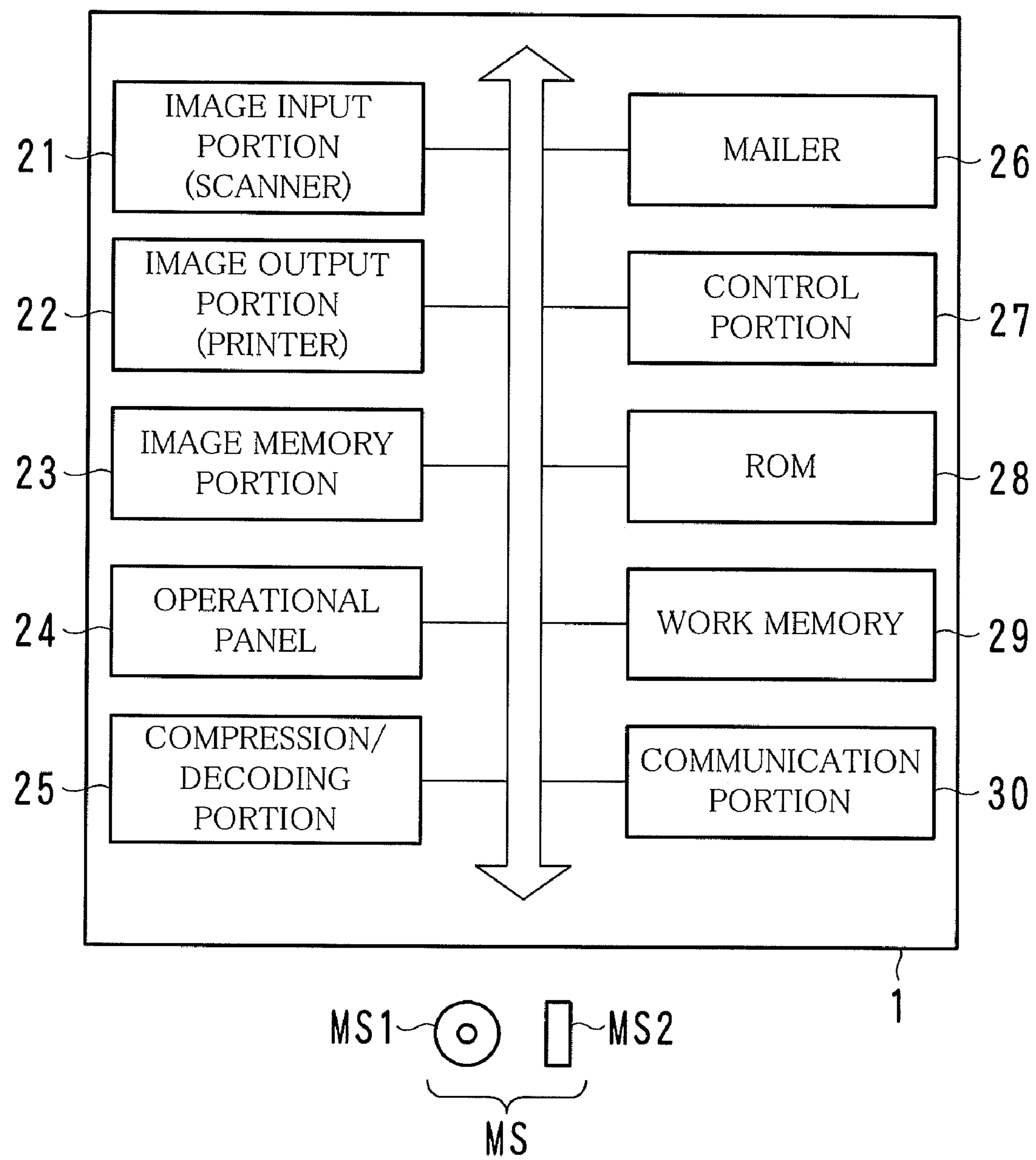
FIG. 2 is a diagram illustrating an example of the hardware configuration of an image forming apparatus.

Referring to FIG. 2, the image forming apparatus 1 is configured of an image input portion 21, an image output portion 22, an image memory portion 23, an operation/display portion (operational panel) 24, a compression/decoding portion 25, a mailer 26, a control portion 27, a ROM 28, a RAM 29, a communication portion 30, and the like.

The image input portion 21 serves to input image data. The image input portion 21 includes a scanner for optically reading images printed on paper to convert the images into image data. The image output portion 22 serves to output image data processed within the image forming apparatus 1. The image output portion 22 includes a printer for printing an image onto paper. The image memory portion 23 serves to temporarily store therein inputted image data or image data that has been subjected to a compression process.

Figure 4:
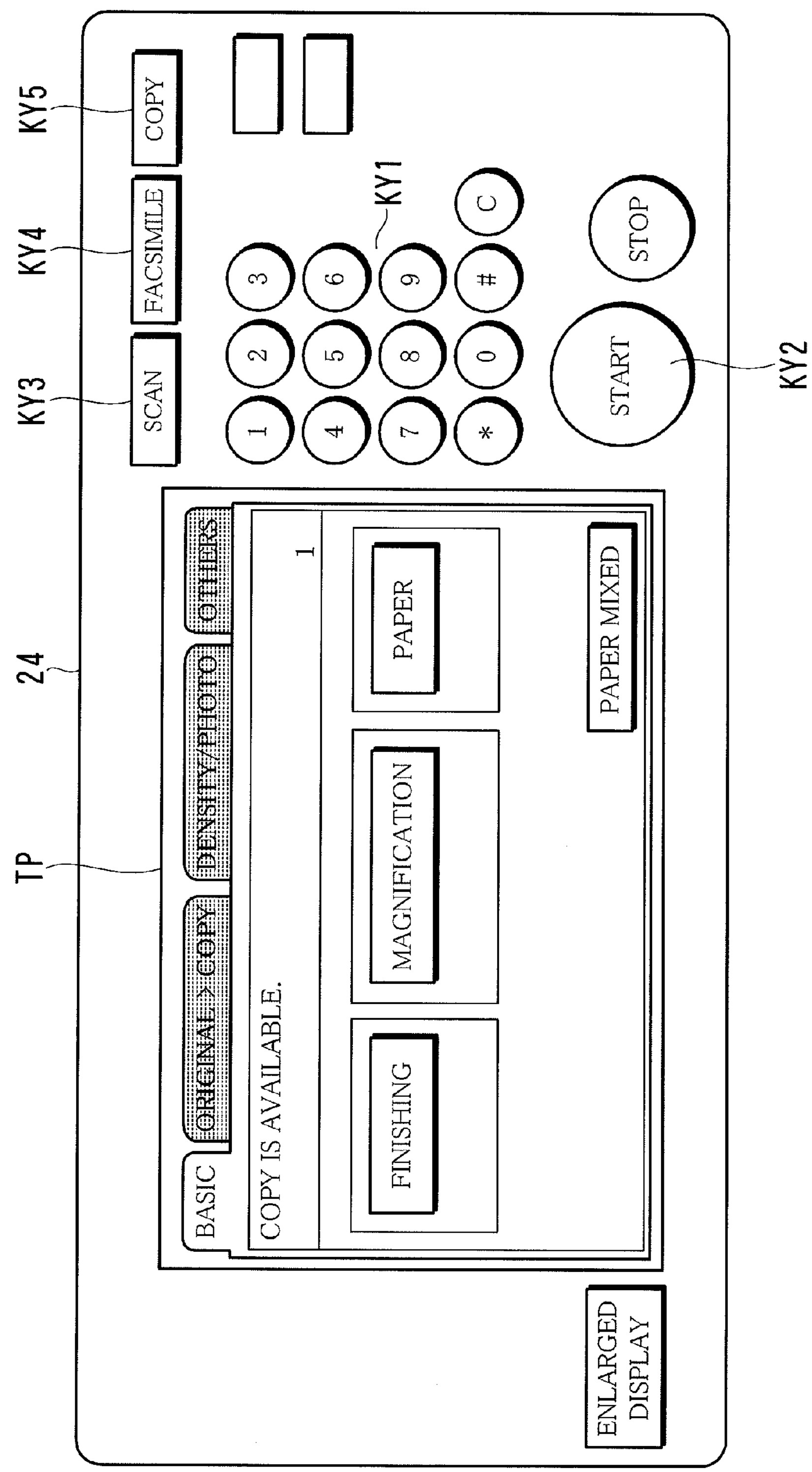
FIG. 4 is a diagram illustrating an example of an operational panel.

Referring to FIG. 4, the operational panel 24 is configured of a variety of operational keys KY, a touchscreen TP including a Liquid Crystal Display (LCD), and the like. The operational keys KY include a numerical keypad KY1, a start key KY2, a scan key KY3, a facsimile key KY4, and a copy key KY5. A variety of screens for operating the image forming apparatus 1 are displayed on the touchscreen TP. A user gives a command to the image forming apparatus 1 by operating, for example, the operational keys KY and keys displayed on the touchscreen TP. A screen for authentication, section names for section authentication, messages, a variety of images, characters, and the like are displayed on the touchscreen TP.

The compression/decoding portion 25 performs a process for compressing inputted image data if necessary, or a process for expanding coded data. The control portion 27 is configured of a CPU, a peripheral circuit, and the like. The CPU executes a program (computer program) stored in the ROM 28 and the ROM 29; thereby the control portion 27 performs an authentication process and image processing, or controls the entirety of the image forming apparatus 1. Such a program is inputted via an appropriate recording medium MS or downloaded via the communication portion 30, and then is installed into the RAM 29 or a hard disk (not shown). The communication portion 30 plays a role as an interface between the subject image forming apparatus 1 and the communication line 3, or between the subject image forming apparatus 1 and other devices.

In this embodiment, the description particularly focuses on an authentication process performed by the control portion 27. The points of the authentication process by the control portion 27 are as follows.

To be specific, the control portion 27 is provided with: a user authentication means for performing a user authentication process on a user by using user authentication information; a section authentication means for performing a section authentication process on the user who has been successfully authenticated by the user authentication means by using section authentication information; an associated information storage means for storing therein associated information in which the user authentication information is associated with the section authentication information; and a selection process means for selecting, after the user has been successfully authenticated by the user authentication means, section authentication information meeting a preset condition from among a plurality of pieces of section authentication information associated with the user authentication information that has been used for the authentication.

The control portion 27 is also provided with a display control means for controlling a display means. In the case where a user is successfully authenticated by the user authentication means, the display control means controls the display means to display an operation screen through which the user operates the image forming apparatus 1. In the case where a verified user specifies a function to be executed by the image forming apparatus 1 on the operation screen, the selection process means selects section authentication information for the specified function.

The control portion 27 is also provided with a default function setting means for setting a default function among functions available in the image forming apparatus 1. The selection process means selects section authentication information for the default function.

The image forming apparatus 1 may be provided with a display control means for controlling a display means, a default function setting means for setting a default function among functions available in the image forming apparatus 1, and a first selection setting means for selecting, in advance, any one of the following two options: one option is to cause the selection process means to select section authentication information for the default function when the user is successfully authenticated by a user authentication portion; and the other option is to cause the display control means to control the display means to display an operation screen through which the image forming apparatus 1 is operated when the user is successfully authenticated by a user authentication portion.

The image forming apparatus 1 may be provided with a second selection setting means for selecting, in advance, any one of the following two options: one option is to cause the selection process means to select section authentication information every time when a function to be executed by the image forming apparatus 1 is changed to another function; and the other option is to cause the selection process means to select section authentication information only for a function that is selected for the first time.

The image forming apparatus 1 may be provided with a log-on history storage means for recording therein a log-on history that is a record for a user to have logged onto the image forming apparatus 1 through a user authentication process and a section authentication process. The selection process means may, with reference to the log-on history recorded in the log-on history storage means, select, as the section authentication information meeting a preset condition, section authentication information corresponding to a section through which a user successfully authenticated by the user authentication means has logged onto the image forming apparatus 1 many times.

The image forming apparatus 1 may be provided with the log-on history storage means for recording therein a log-on history that is a record for a user to have logged onto the image forming apparatus 1 through a user authentication process and a section authentication process. The selection process means may, with reference to the log-on history recorded in the log-on history storage means, select, as the section authentication information meeting a preset condition, section authentication information corresponding to a section through which a user successfully authenticated by the user authentication means has logged onto the image forming apparatus 1 most recently.

The following is a detailed description of the authentication process performed in the image forming apparatus 1, with reference to drawings.

FIG. 3 shows the configuration of an authentication process portion NN functionally implemented by the control portion 27 of the image forming apparatus 1.

Referring to FIG. 3, the authentication process portion NN includes a user authentication portion 41, a section authentication portion 42, a section selection process portion 43, a display control portion 44, a control process portion 45, a user authentication information storage portion 46, a section authentication information storage portion 47, an associated information storage portion 48, a history information storage portion 49, and a setting portion 50. The setting portion 50 includes a default function setting portion 51, a first selection setting portion 52, and a second selection setting portion 53.

The user authentication portion 41 uses user authentication information UNJ to perform a user authentication process on a user. To be specific, the user authentication portion 41 compares a user ID and a password entered by the user with the user authentication information UNJ stored in the user authentication information storage portion 46. If there is a match therebetween, it means that the user authentication is successful, i.e., that the user is successfully authenticated. If there is no match therebetween, it means that the user authentication fails, i.e., that the user is not successfully authenticated.

The section authentication portion 42 uses section authentication information BNJ to perform a section authentication process on the user. The following methods are some examples of the section authentication process.

In the first method, a comparison is made between a section number (section information) as well as a password directly entered by the user and the user authentication information UNJ stored in the user authentication information storage portion 46. If there is a match therebetween, the section authentication process is performed on the user.

In the second method, associated information HJ in which the user authentication information UNJ is associated, in advance, with the section authentication information BNJ is used. In the case where a user is successfully authenticated by user authentication, a section is specified or selected, for the user, from among sections indicated in the section authentication information BNJ associated with the user authentication information UNJ of the user. Then, a section authentication process is automatically performed for the specified or selected section.

In essence, in the case where a user is successfully authenticated by a user authentication process, a section authentication process is performed for a section associated with the user, and the user is permitted to log onto the image forming apparatus 1 through the section merely by the authentication based on the user authentication process. The section authentication according to the second method may be hereinafter referred to as "cooperative section authentication" because the section authentication is performed in cooperation with the user authentication. Alternatively, the section authentication according to the second method may be hereinafter referred to as "associating authentication" because the section authentication is performed based on the associated information HJ described later.

As just discussed above, according to the cooperative section authentication, a user makes registration (associating registration or cooperative registration) of a desired section as the associated information HJ without directly entering a section number and a password of the desired section. Thereby, section authentication is performed.

It is possible to set, in advance, whether or not to perform cooperative section authentication. If setting is so made that the cooperative section authentication is to be performed, then the cooperative section authentication is performed immediately after user authentication has been performed, or, alternatively, after user authentication has been performed and when the need for section authentication arises. Conversely, if setting is so made that the cooperative section authentication is not to be performed, then the section authentication is performed, based on the first method described above, immediately after user authentication has been performed, or, alternatively, after user authentication has been performed and when the need for section authentication arises. It is possible to set, on a user-by-user basis, whether or not to perform cooperative section authentication.

After the user has been successfully authenticated by the user authentication portion 41, the section selection process portion 43 selects a piece of section authentication information BNJ meeting with a preset condition (rule) from among a plurality of pieces of section authentication information BNJ associated with the user authentication information UNJ that has been used for the user authentication. Stated differently, upon performing section authentication or cooperative section authentication, the section selection process portion 43 selects a piece of section authentication information BNJ meeting with a preset condition from among a plurality of pieces of section authentication information BNJ.

Note that the phrase "selecting a piece of section authentication information BNJ" means selecting a section indicated in the section authentication information BNJ from the standpoint of the user. Accordingly, a "section indicated in the section authentication information BNJ" may be hereinafter referred to as simply a "section BNJ".

The section selection process portion 43 selects a section BNJ for a function specified by the user, or, alternatively, a function set as a default function by the default function setting portion 51.

The default function is selected from among the functions available in the image forming apparatus 1, and the selected default function is set in the default function setting portion 51. The functions available in the image forming apparatus 1 are, for example, a copy function, a facsimile function, a scanning function, a mail function.

It is possible to set whether or not to perform a process by the section selection process portion 43. Referring to a section selection method setting screen GM8 illustrated in FIG. 16, for example, if a box BX1 for "narrow down" is selected and an OK key KY21 is pressed, then setting is so made that the section selection process portion 43 performs a section selection process. If a box BX2 for "not narrow down" is selected and the OK key KY21 is pressed, then setting is so made that the section selection process portion 43 does not perform a section selection process. In this way, a setting can be made as to whether the image forming apparatus 1 automatically selects (preselects) a section or a user selects a section by himself/herself.

Figure 17:
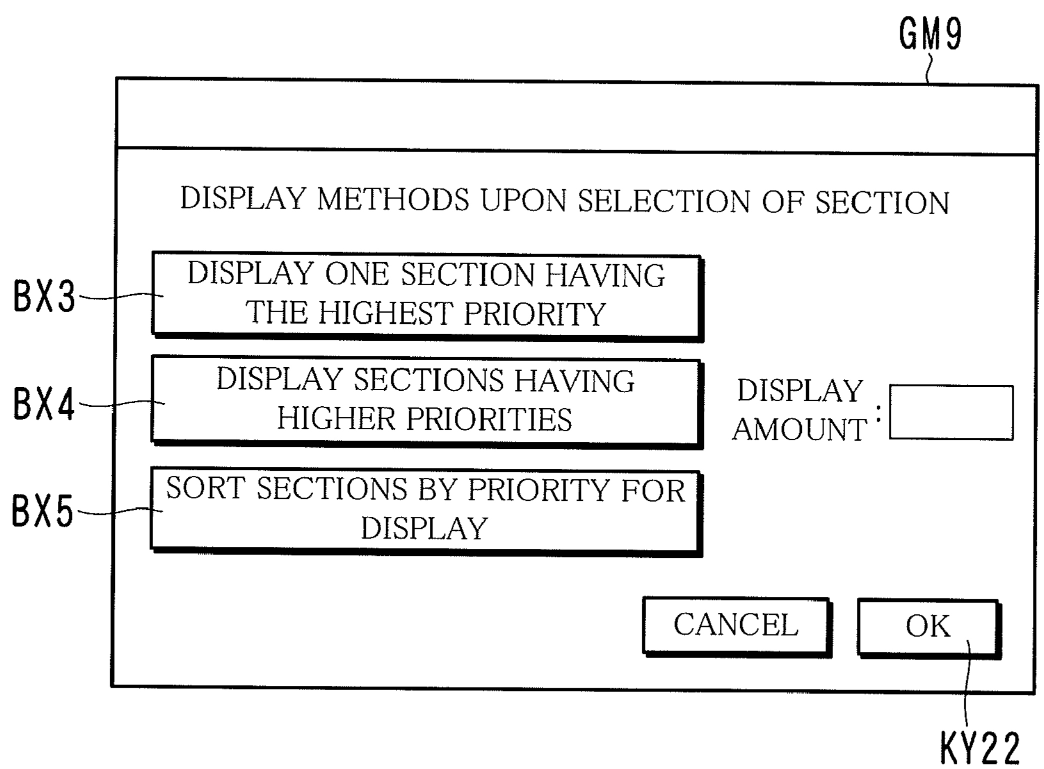
FIG. 17 is a diagram illustrating an example of a display method setting screen upon selection of a section.

In the case where the section selection process portion 43 has performed a section selection process, how the selected sections BNJ are displayed can be set in various ways. Referring to FIG. 17, for example, three kinds of display methods can be set on a display method setting screen GM9 for selection of a section.

If a box BX3 for "display one section having the highest priority" is selected and an OK key KY22 is pressed on the display method setting screen GM9, then only one section to which the top priority is given is selected from among a plurality of sections, and the selected section is displayed on the touchscreen TP.

If a box BX4 for "display sections having higher priorities" is selected, a numerical value is entered in the field of "display amount", and the OK key KY22 is pressed on the display method setting screen GM9, then sections whose amount corresponds to the number specified in the "display amount" field are selected, from among a plurality of sections, in order of decreasing priority from one having the top priority, and the selected sections are displayed on the touchscreen TP.

If a box BX5 for "sort sections by priority for display" is selected and the OK key KY22 is pressed on the display method setting screen GM9, then a plurality of sections are sorted in descending priority order and the sorted sections are displayed on the touchscreen TP.

A determination is made, depending on the details set by the second selection setting portion 53, as to whether the section selection process portion 43 selects a section BNJ every time when a function to be executed by the image forming apparatus is changed to another function, or, alternatively, the section selection process portion 43 selects a section BNJ only when a function is selected for the first time.

The section BNJ thus selected is displayed on a screen of the operational panel 24. The section selection process portion 43 can use a variety of conditions as conditions under which a section BNJ is selected. The conditions will be described later. Note that the phrase "conditions under which a section BNJ is selected" can be restated as the phrase "conditions under which a selected section BNJ is displayed".

The display control portion 44 controls the display portion of the touchscreen TP of the operational panel 24. The display control portion 44 is configured to, when a user has been successfully authenticated by the user authentication portion 41, display, after the authentication, on the display portion, a screen for cooperative section authentication, or, alternatively, display, on the display portion, an operation screen through which the user operates the image forming apparatus 1. Which screen is to be displayed on the display portion depends on the details set by the first selection setting portion 52.

The control process portion 45 controls the user authentication portion 41, the section authentication portion 42, and the section selection process portion 43. The control process portion 45 also controls the image input portion 21, the image output portion 22, the operational panel 24, the mailer 26, and the individual portions of the image forming apparatus 1.

Figure 5:
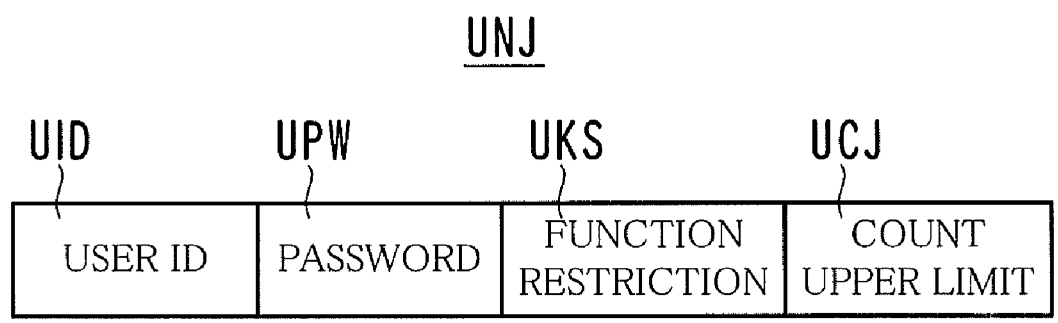
FIG. 5 is a diagram illustrating an example of user authentication information.

The user authentication information storage portion 46 stores, therein, the user authentication information UNJ. Referring to FIG. 5, the user authentication information UNJ includes a user ID UID, a password UPW, a function restriction UKS, and a count upper limit UCJ. The function restriction UKS is, for example, a restriction on an available function or unavailable function. The count upper limit UCJ is, for example, the number of times used of each of the functions.

Figure 6:
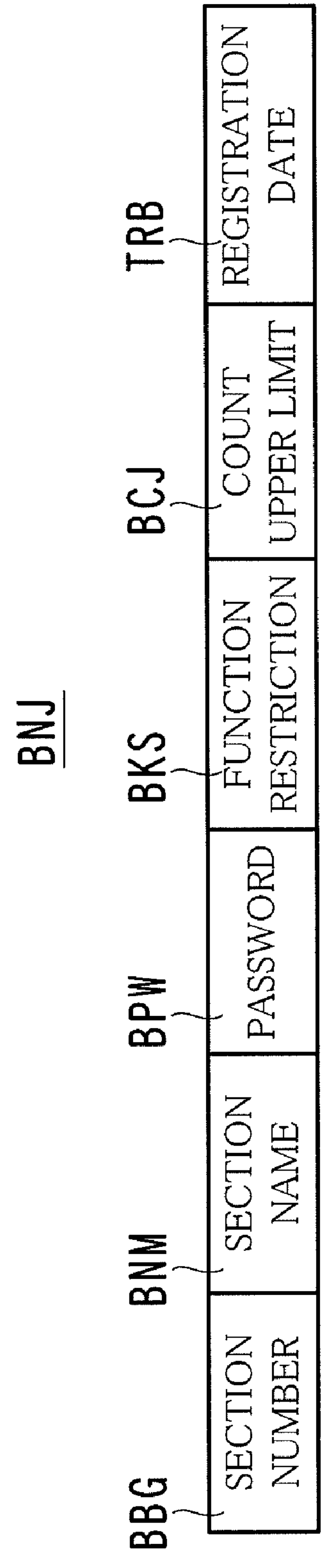
FIG. 6 is a diagram illustrating an example of section authentication information.

The section authentication information storage portion 47 stores, therein, the section authentication information BNJ. Referring to FIG. 6, the section authentication information BNJ includes a section number BBG, a section name BNM, a password BPW, a function restriction BKS, a count upper limit BCJ, and a registration date TRB. A section ID or a section code may be used as the section number BBG.

The associated information storage portion 48 stores, therein, the associated information HJ. As illustrated in FIG. 7, one section number BBG or more are recorded in the associated information HJ for each function KN corresponding to a user ID. In the illustrated example, as for a user corresponding to the user ID "U001", section numbers BBG, i.e., "1", "2", and "3", correspond to a "copy" function KN, and section numbers BBG, i.e., "1" and "2", correspond to a "facsimile" function KN in the associated information HJ.

Thus, the associated information HJ is to associate a user of the image forming apparatus 1 with the individual sections. A user or an administrator of the image forming apparatus 1 records, in advance, the associated information HJ. Hereinafter, "associating" a user with a section is sometimes referred to as "correlating" a user with a section. Likewise, "associated information" is hereinafter sometimes referred to as "correlated information".

In the illustrated example of FIG. 7, three sections BNJ (section numbers BBG) or so are recorded for one function KN corresponding to one user. It is highly possible that a plurality of sections BNJ more than three are recorded therefor. In such a case, the user is required to select one of the sections BNJ, and the section selection process portion 43 selects section(s) BNJ satisfying a preset condition in order to help the user in the selection.

The history information storage portion 49 stores, therein, a log-on history LR. The log-on history LR is information on a record for a user to have logged onto the image forming apparatus 1 through a user authentication process and a section authentication process.

FIGS. 8A-8C are diagrams illustrating examples of the log-on history LR. The log-on histories LR1-LR3 respectively shown in FIGS. 8A-8C are log-on histories for users corresponding to the user IDs "U001", "U002", and "U003", respectively.

The individual log-on histories LR record, therein, on a user-by-user basis, the date and time NJ at which the user has logged onto the image forming apparatus 1, the function KN, the section number BBG. Every time when the user logs onto the image forming apparatus 1, the log-on history LR for the user is updated.

The section selection process portion 43 refers to the log-on history LR and selects, as a section BNJ satisfying a preset condition, the section BNJ (section number BBG) corresponding to a section through which a user successfully authenticated by the user authentication portion 41 has often logged onto the image forming apparatus 1.

Referring to the log-on history LR1 in FIG. 8A, for example, a section whose section number BBG is "1" is selected for a "copy" function, and a section whose section number BBG is "2" is selected for a "facsimile" function.

Alternatively, the section selection process portion 43 refers to the log-on history LR and selects, as a section BNJ satisfying a preset condition, the section BNJ (section number BBG) corresponding to a section through which a user successfully authenticated by the user authentication portion 41 has most recently logged onto the image forming apparatus 1.

Referring to the log-on history LR1 in FIG. 8A, for example, a section whose section number BBG is "1" is selected for a "copy" function, and a section whose section number BBG is "2" is selected for a "facsimile" function.

The default function setting portion 51 sets one function KN as a default function in accordance with a command issued by a user. To be specific, when the section selection process portion 43 selects a section BNJ for a user, it is necessary to specify a function KN for the section BNJ. The default function setting portion 51 presets the function KN to be specified as a default function.

The first selection setting portion 52 determines in advance whether to display a screen for cooperative section authentication for a case in which a user has been successfully authenticated by the user authentication portion 41, or to display the operation screen for that case.

Figure 18:
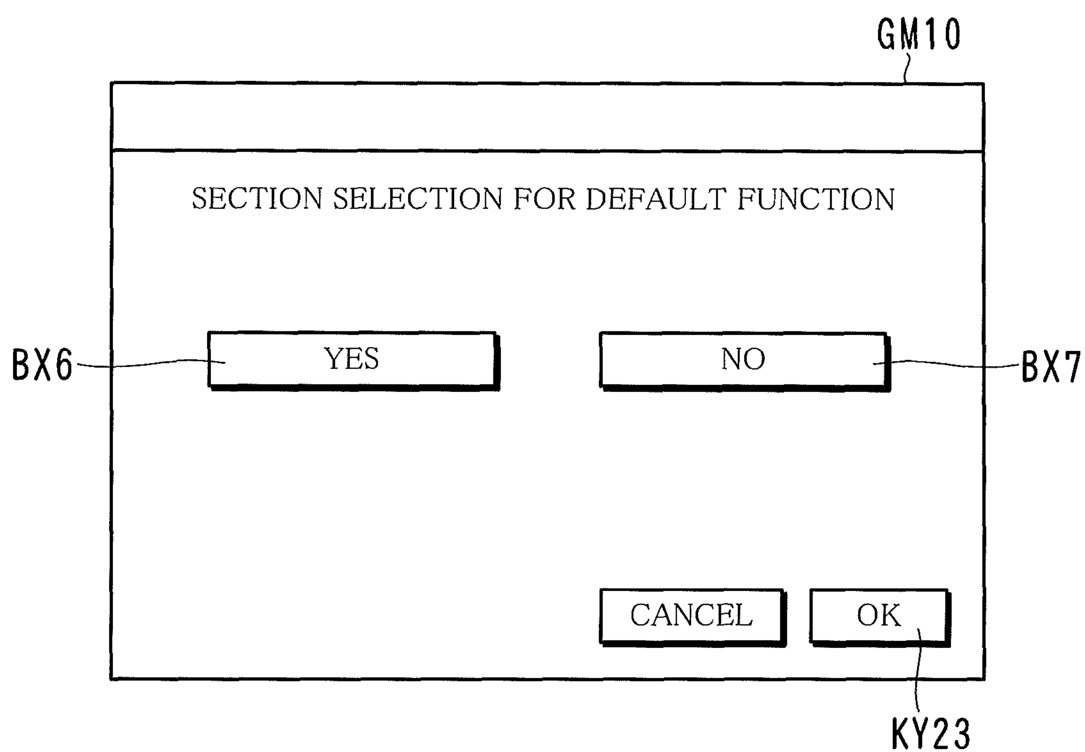
FIG. 18 is a diagram illustrating an example of a section selection setting screen.

Referring to a section selection setting screen GM10 in FIG. 18, for example, if a user selects a box BX6 for "YES", and presses an OK key KY23, then setting is performed in such a manner that the screen for cooperative section authentication, e.g., the screens GM4-GM7 are displayed after the user has been successfully authenticated. Conversely, if the user selects a box BX7 for "NO", and presses the OK key KY23, then setting is performed in such a manner that an operation screen GM2 is displayed on the display portion when the user has been successfully authenticated.

An administrator or a user of the image forming apparatus 1 performs the setting on the first selection setting portion 52. The setting may be performed on a user-by-user basis. In such a case, the individual users can perform the setting by themselves.

The second selection setting portion 53 determines in advance whether to select a section BNJ every time when a function is changed to another function, or to select a section BNJ for a function only for a case in which the function is selected for the first time.

Figure 19:
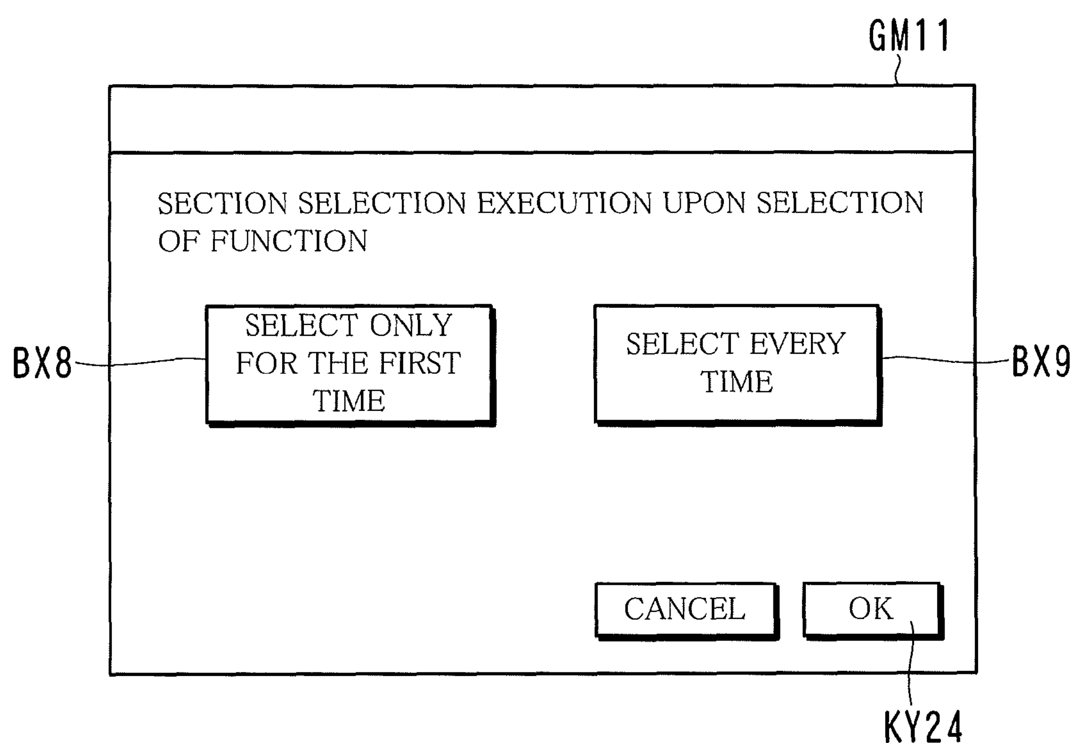
FIG. 19 is a diagram illustrating an example of a section selection execution setting screen.

Referring to a section selection execution setting screen GM11 in FIG. 19, if a box BX8 for "select only for the first time" is selected and an OK key KY24 is pressed, then setting is performed in such a manner that a section BNJ for a function is selected only when the function is selected for the first time. Accordingly, in the case where such setting is performed and a function that is the same as the previous function is selected next time, the section selection process is not performed and the section BNJ selected before is used.

In contrast, if a box BX9 for "select every time" is selected and the OK key KY24 is pressed, then setting is performed in such a manner that a section BNJ is selected every time when a function is changed to another function. Accordingly, even when a function that is the same as the current function is selected next time, the section selection process is performed for each selection.

The administrator or a user of the image forming apparatus 1 performs the setting on the second selection setting portion 53. The setting may be performed on a user-by-user basis. In such a case, the individual users can perform the setting by themselves.

Further, the setting portion 50 can perform a variety of settings other than those described above. After a user has been successfully authenticated by a user authentication process, the setting portion 50 concurrently performs a section authentication process on the user for all the functions KN registered for the user. In short, setting may be so made that a section authentication process is performed only once on all the functions KN.

The following is a description of an authentication process in order for a user to log onto the image forming apparatus 1, in particular, of a condition under which a section BNJ is selected, with reference to FIGS. 9-19.

Note that the details of indication on the individual screens GM are merely examples, and are sometimes different from the details of the user authentication information UNJ, the section authentication information BNJ, the associated information HJ, or the like.

When the image forming apparatus 1 is turned ON, a user authentication process is performed on a user in order for him/her to use the image forming apparatus 1.

Figure 9:
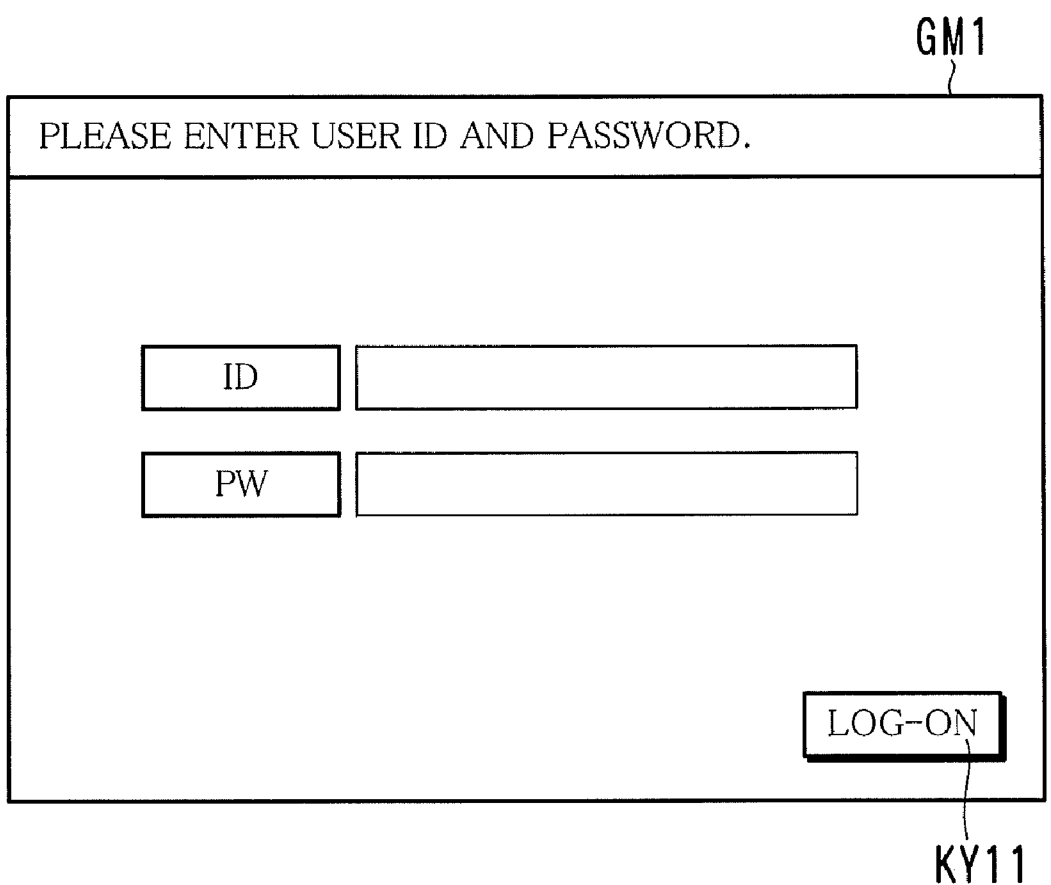
FIG. 9 is a diagram illustrating an example of a user authentication screen.

FIG. 9 shows a user authentication screen GM1 displayed on the display portion of the touchscreen TP. The user enters a user ID and a password on the user authentication screen GM1, and presses a log-on key KY11. Thereby, a user authentication process is performed.

Figure 10:
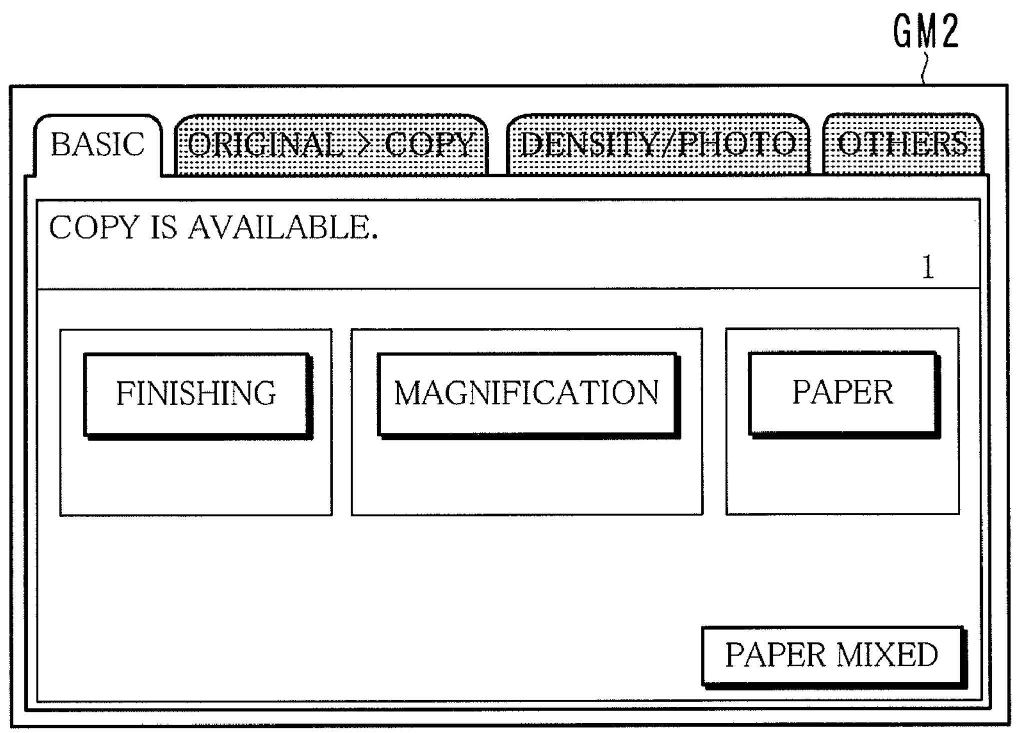
FIG. 10 is a diagram illustrating an example of an initial operation screen.

After the user authentication, a screen depending on the setting performed in the first selection setting portion 52 is displayed. In the case where setting has been performed such that the operation screen is displayed, an initial operation screen GM2 is displayed as shown in FIG. 10. In the case where the user performs operation on the operation screen GM2 or the operational panel 24, and the need for section authentication arises, a screen for a section authentication process is displayed.

Figure 11:
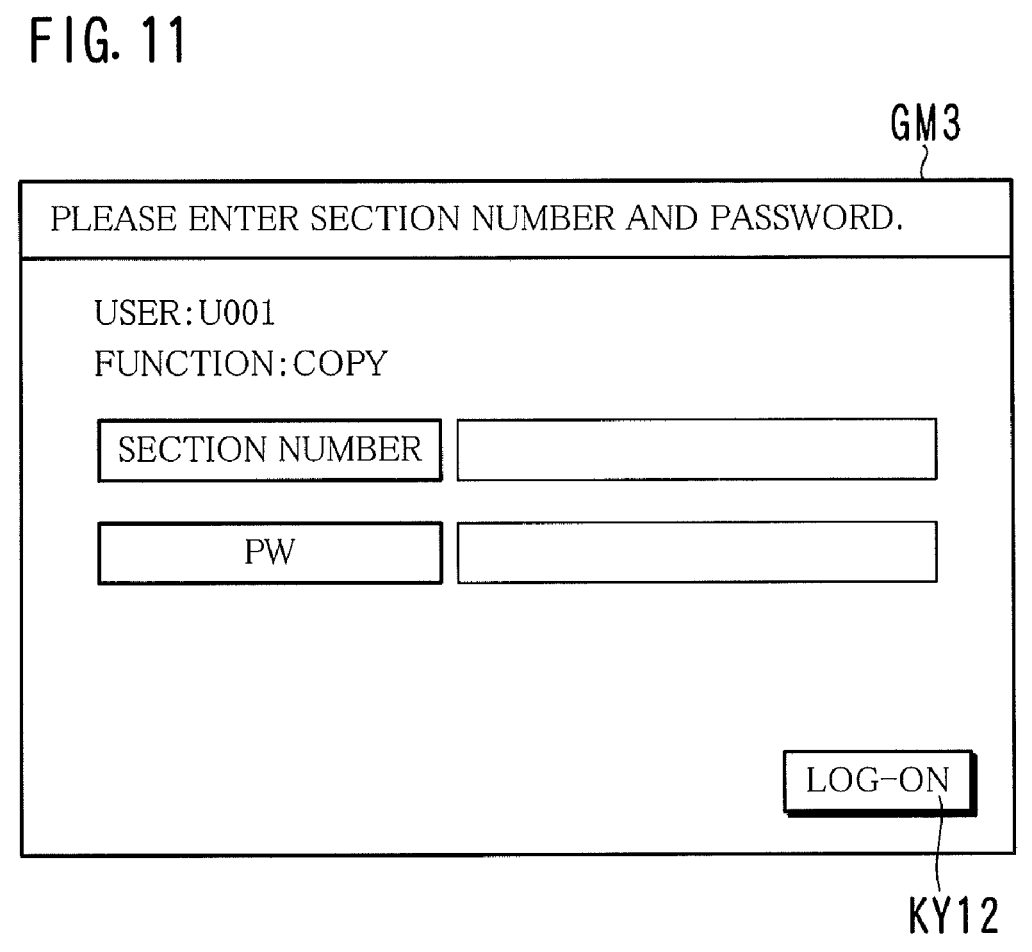

For example, if the facsimile key KY4 is pressed on the operational panel 24 of FIG. 4, then a section authentication screen GM3 as illustrated in FIG. 11 is displayed on the touchscreen TP.

A user enters a section number BBG and a password on the section authentication screen GM3, and presses a log-on key KY12. Thereby, a section authentication process is performed.

On the other hand, in the case where setting has been performed in the first selection setting portion 52 such that a screen for cooperative section authentication is displayed, such a screen appears.

Figure 12:
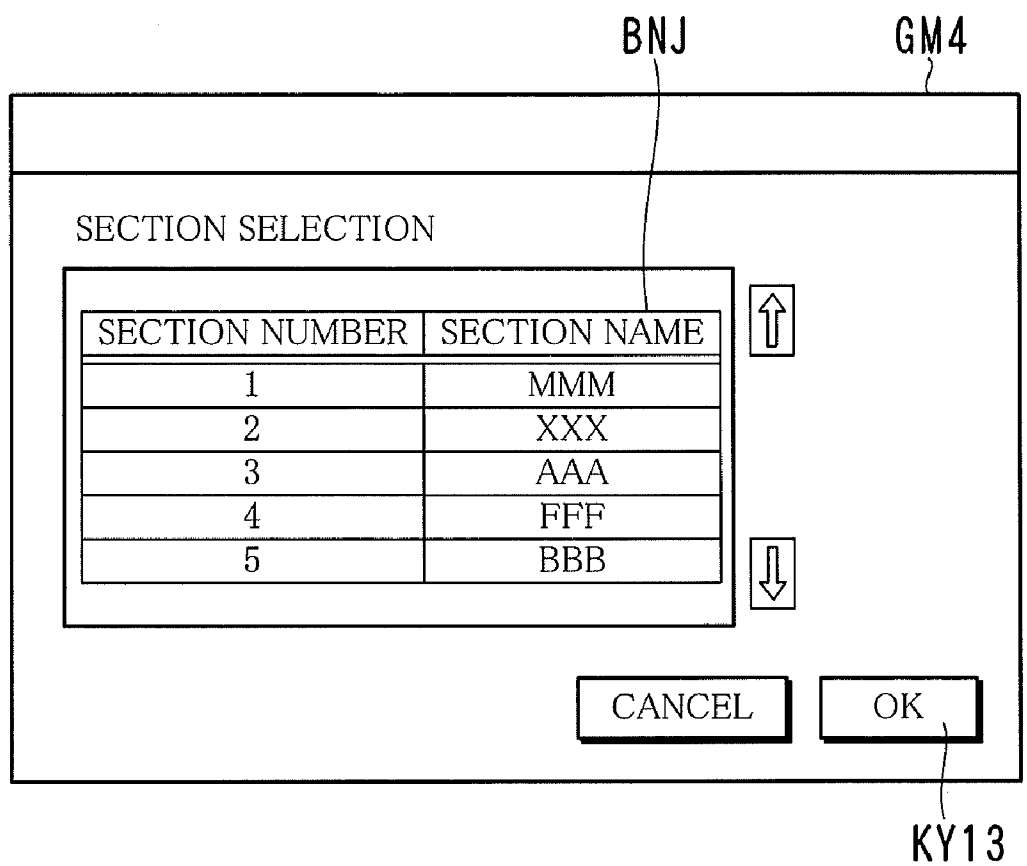
FIG. 12 is a diagram illustrating an example of a section selection screen.
Figure 16:
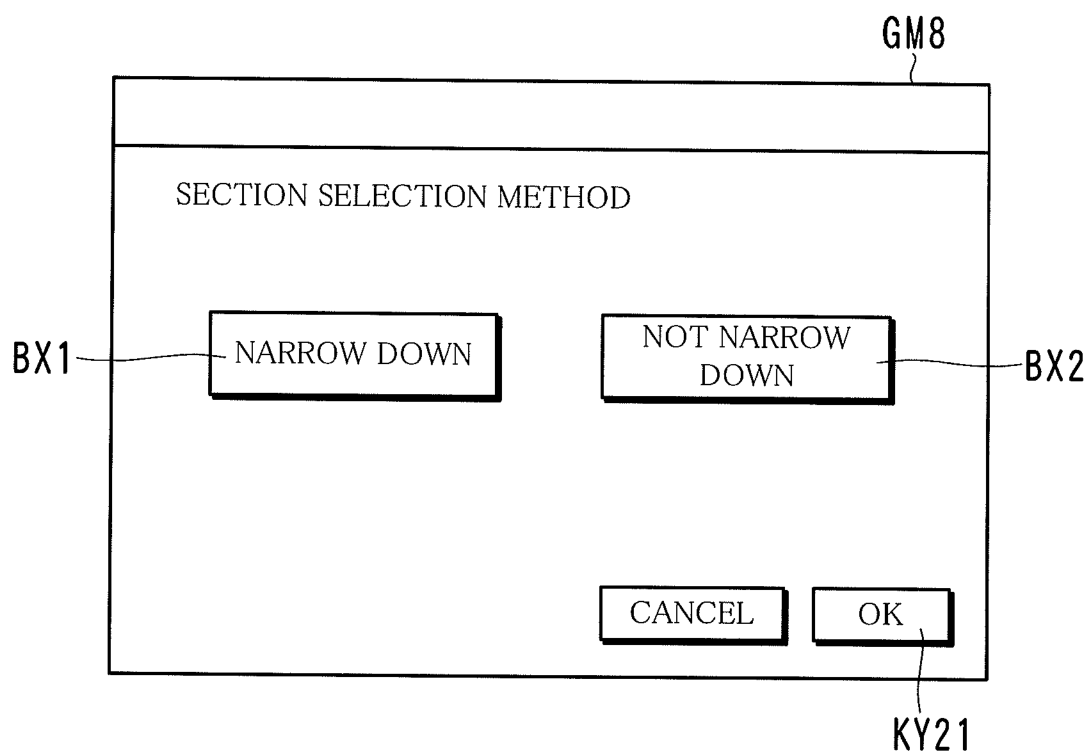
FIG. 16 is a diagram illustrating an example of a section selection method setting screen.

At this time, the section selection screen GM4 is displayed as illustrated in FIG. 12 if the setting "not narrow down" has been made on the section selection method setting screen GM8 in FIG. 16.

The section selection screen GM4 in FIG. 12 displays, thereon, all the sections BNJ registered in the associated information HJ for the user. To be specific, all the sections BNJ associated with the "facsimile" function KN and registered in the associated information HJ for the user are displayed in numerical order of the section number BBG on the section selection screen GM4.

Referring to FIG. 12, five sections BNJ are visible on the section selection screen GM4. This means that not all the sections BNJ associated with the "facsimile" function KN in the associated information HJ are concurrently visible on the screen. Stated differently, not all such sections BNJ are displayed in one page of the section selection screen GM4.

Here, all the sections BNJ associated with the "facsimile" function KN and registered in the associated information HJ are seven sections BNJ, i.e., "MMM", "XXX", "AAA", "FFF", "BBB", "GGG", and "KKK" which respectively have the section numbers 1-7. In such a case, for example, sections BNJ that are invisible on the section selection screen GM4 of FIG. 12 appear by changing pages from the current page to another. In the illustrated example, such invisible sections BNJ appear by scrolling down on the section selection screen GM4.

The user scrolls up/down on the section selection screen GM4 appropriately, and selects one section BNJ from among the sections BNJ displayed thereon. If the user presses an OK key KY13, then the cooperative section authentication is finished for the selected section BNJ, and the "facsimile" function becomes available. At this time, a basic screen for the facsimile function is displayed on the touchscreen TP.

It is possible to omit the section numbers BBG from the indication on the section selection screen GM4 in FIG. 12.

Figure 13:
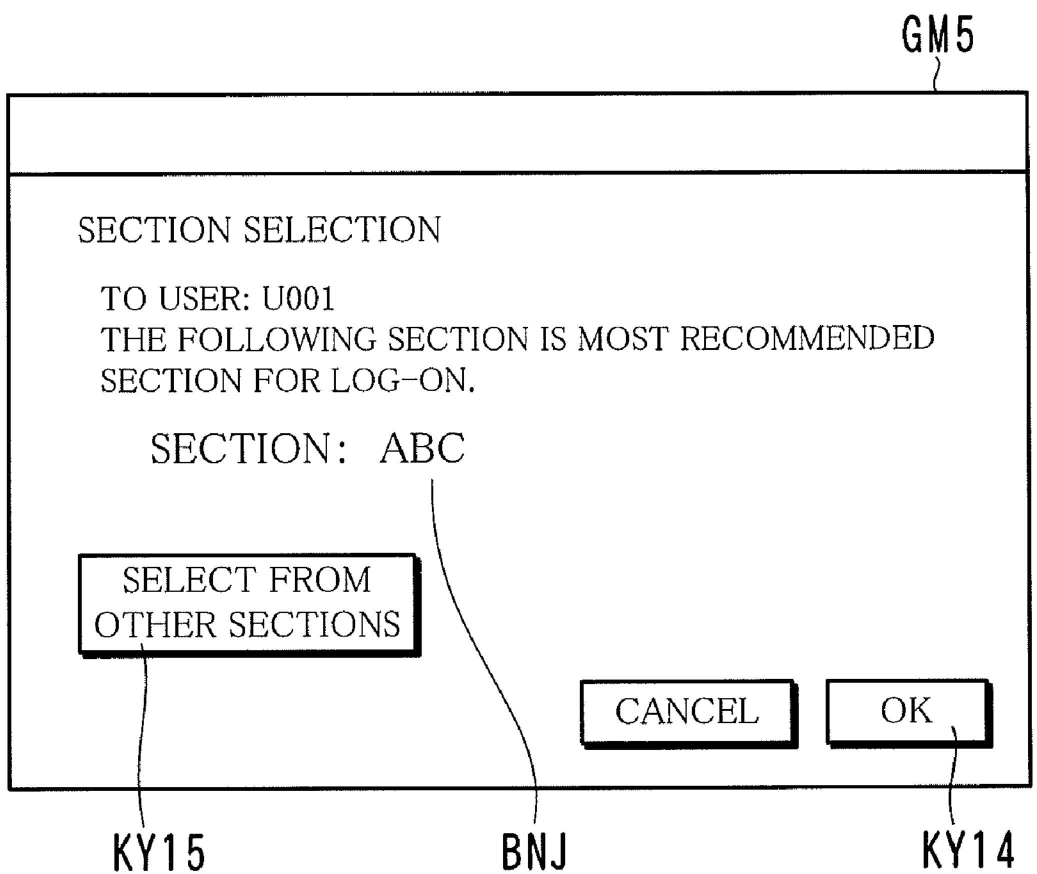
FIG. 13 is a diagram illustrating an example of a section selection screen.

Alternatively, if the setting "narrow down" has been made on the section selection method setting screen GM8 in FIG. 16, and, at the same time, the setting "display one section having the highest priority" has been made on the display method setting screen GM9 in FIG. 17, then a section selection screen GM5 as shown in FIG. 13 is displayed.

Referring to the section selection screen GM5 in FIG. 13, of the sections BNJ associated with the "facsimile" function KN and registered in the associated information HJ for the user, the section "ABC" having the highest priority is displayed. Note that a condition under which the priority is determined is preset. If a plurality of sections BNJ which satisfy the preset condition and have the highest priority are found, then all the sections BNJ thus found are displayed.

If the user is to select the section BNJ displayed on the section selection screen GM5, then he/she presses an OK key KY14. Thereby, the cooperative section authentication is finished, so that the "facsimile" function becomes available. Otherwise, he/she presses a "select from other sections" key KY15. Responding to this, a list of the other sections BNJ associated with the "facsimile" function KN and registered in the associated information HJ for the user is displayed. The user, then, selects a section BNJ from among the list of the sections BNJ.

Figure 14:
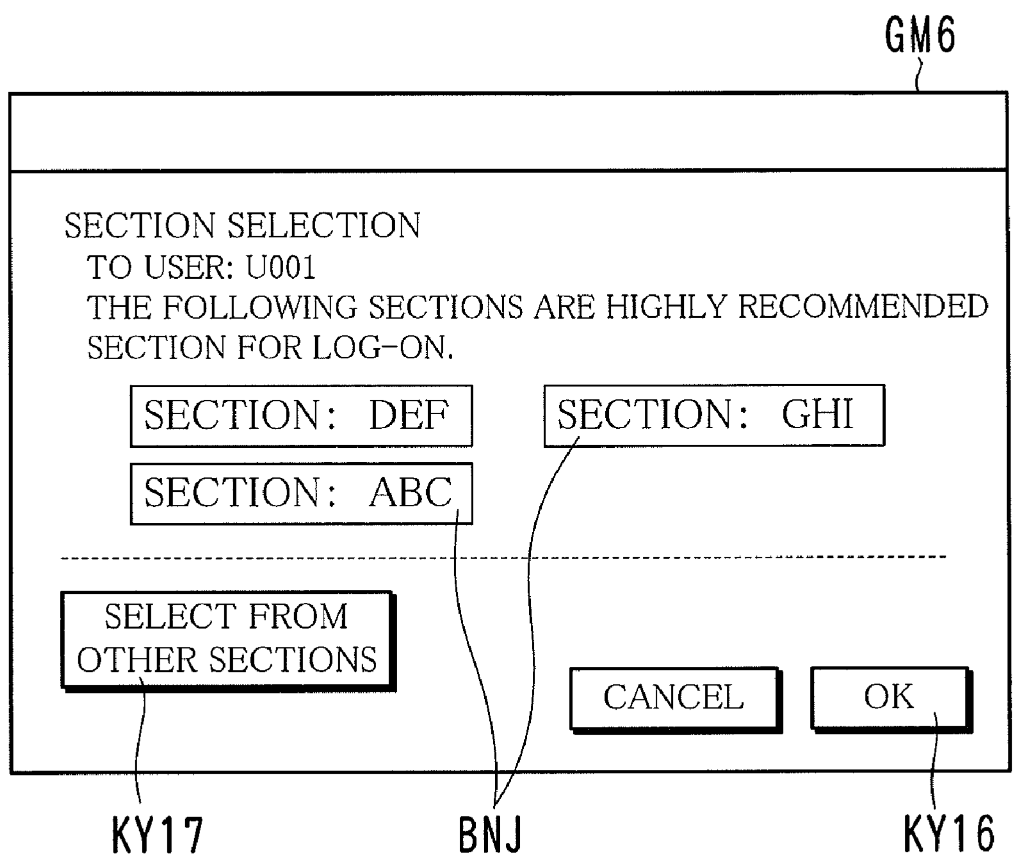
FIG. 14 is a diagram illustrating an example of a section selection screen.

Alternatively, if the setting "display sections having higher priorities" has been made, and "3" has been set in the "display amount" field on the display method setting screen GM9 in FIG. 17, then a section selection screen GM6 as shown in FIG. 14 is displayed.

Referring to the section selection screen GM6 in FIG. 14, of the sections BNJ associated with a selected function KN and registered in the associated information HJ for the user, three sections "DEF", "GHI", and "ABC" having higher priorities are displayed.

The user selects one desired section BNJ from among the sections BNJ displayed on the section selection screen GM6, and presses an OK key KY16. Thereby, the cooperative section authentication is finished, so that the selected function becomes available. If there is no desired section BNJ among the displayed sections BNJ, then he/she presses a "select from other sections" key KY17. Responding to this, a list of the other sections BNJ associated with the selected function and registered in the associated information HJ for the user is displayed. The user selects a desired section BNJ from among the list of the sections BNJ.

Figure 15:
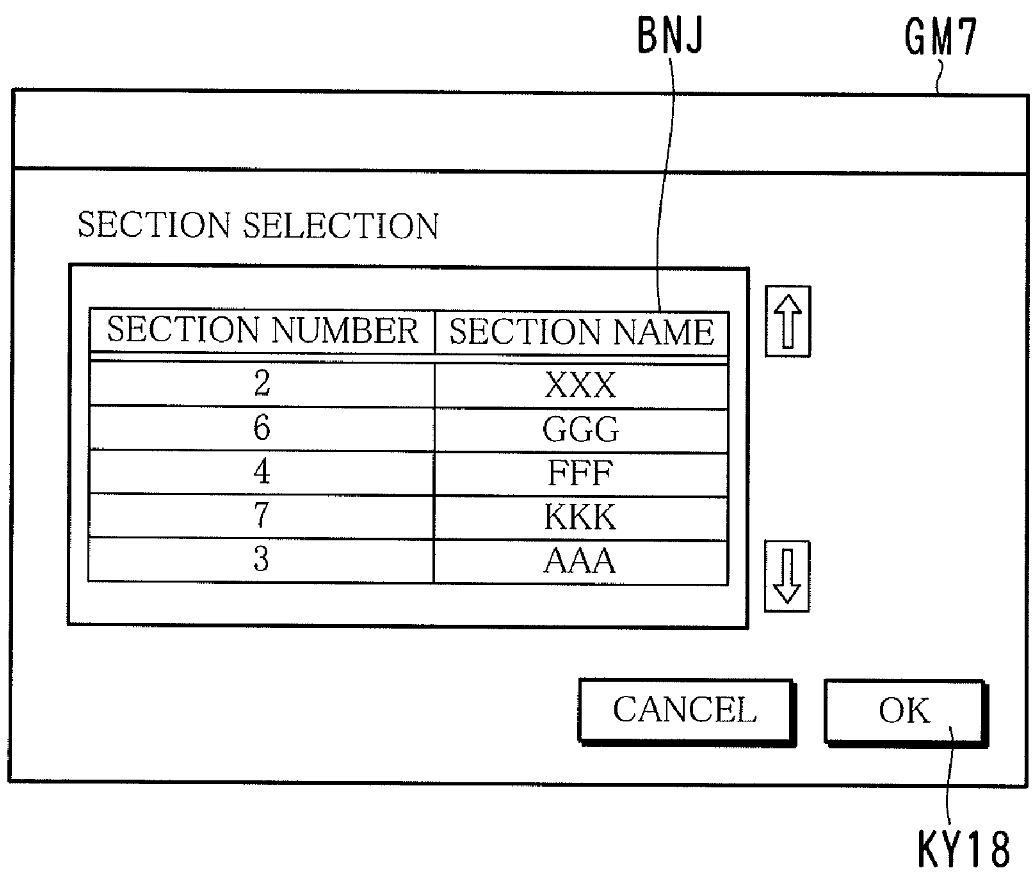
FIG. 15 is a diagram illustrating an example of a section selection screen.

Yet alternatively, if the setting "sort sections by priority for display" has been made on the display method setting screen GM9 in FIG. 17, then a section selection screen GM7 as shown in FIG. 15 is displayed.

Referring to the section selection screen GM7 in FIG. 15, all the sections BNJ associated with a selected function KN and registered in the associated information HJ for the user are sorted in order of decreasing priority from one having the highest priority, and the sorted sections are displayed. In other words, the sections BNJ on the section selection screen GM4 of FIG. 12 are sorted out in order of decreasing priority, and the resultant is displayed on the section selection screen GM7 in FIG. 15

The user selects one desired section BNJ from among the sections BNJ displayed on the section selection screen GM7, and presses an OK key KY18. Thereby, the cooperative section authentication is finished, so that the selected function becomes available.

The following is a description of a variety of examples of a process for a user to log onto the image forming apparatus 1, with reference to the flowcharts of FIGS. 20-29.

Figure 20:
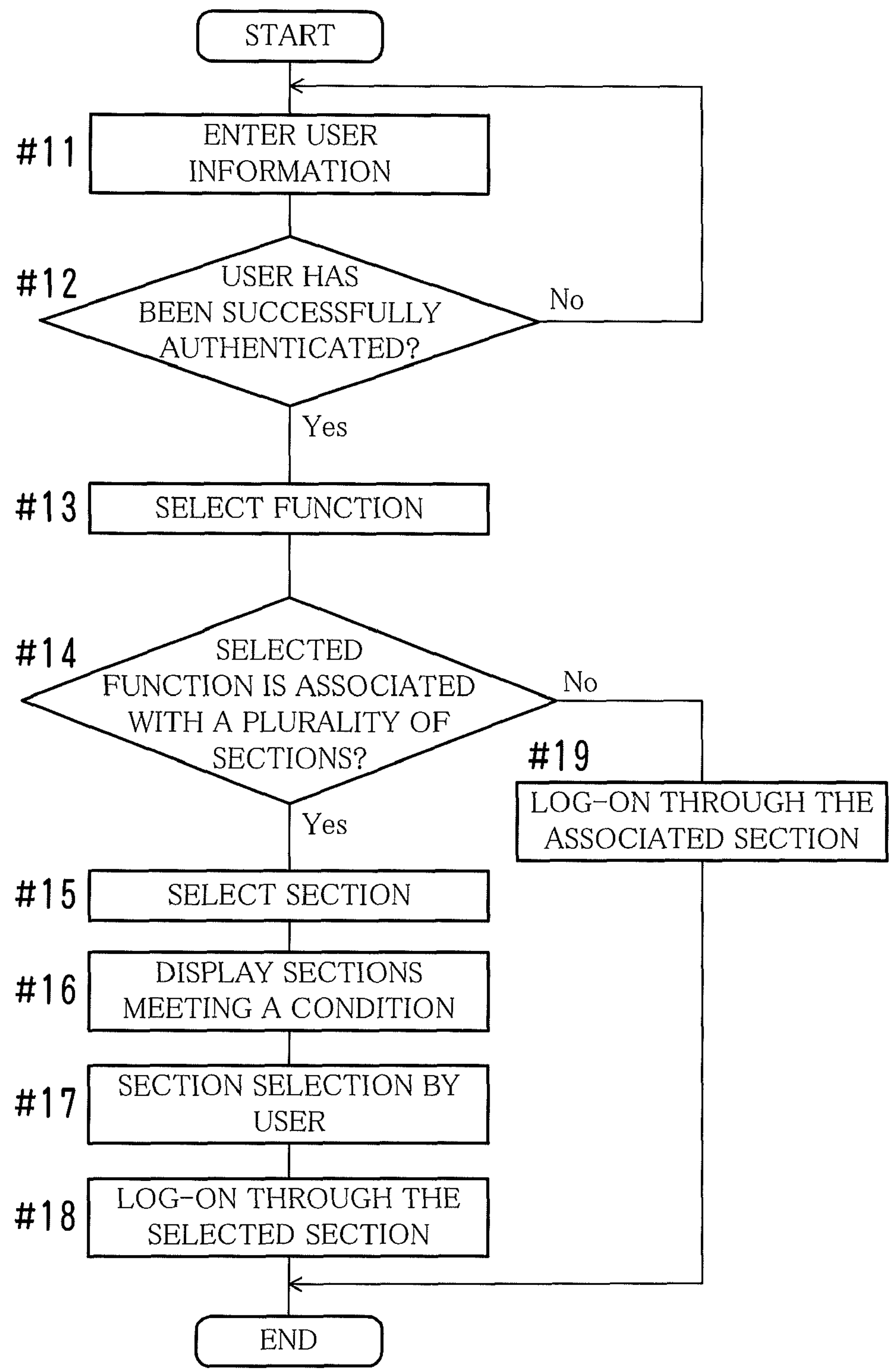
FIG. 20 is a flowchart illustrating an example of a process for logging onto an image forming apparatus.

Referring to FIG. 20, the user enters a user ID and a password UPW on the user authentication screen GM1; thereby user authentication is performed on the user (#11). If the user is successfully authenticated (Yes in #12), then he/she is permitted to operate the image forming apparatus 1.

A function KN is selected in accordance with the operation by the user or the details set as a default function (#13).

If the selected function is associated with only one section BNJ for the user (No in #14), then the user logs onto the image forming apparatus 1 through the section BNJ (#19).

If the selected function is associated with a plurality of sections BNJ (Yes in #14), then the section selection process portion 43 performs a process for selecting section(s) BNJ (#15). Then, section(s) BNJ satisfying a preset condition are displayed (#16).

In the case where a plurality of sections BNJ are displayed, the user selects a desired section BNJ from among the sections BNJ (#17). Thereby, cooperative section authentication is performed, and the user logs onto the image forming apparatus 1 through the selected section BNJ (#18).

In the case where the user intends to log onto the image forming apparatus 1 through sections BNJ different depending on the functions provided in the image forming apparatus 1, settings relating to all the past section authentication processes are cancelled in order to change the function KN, and a section authentication process is performed once again.

Taking an example of copy output and facsimile output, sections to which these output materials are to be provided sometimes differ from each other. To be specific, for example, copies are distributed among group members, and a facsimile is delivered to another group.

In view of this, a user authentication process is first performed on a user and a right to use the image forming apparatus 1 is given to the user; thereafter, the user is prompted to select a function to be used. Upon receiving the selection of the function from the user, the image forming apparatus 1 selects a section BNJ fit for the purpose of the function.

Figure 21:
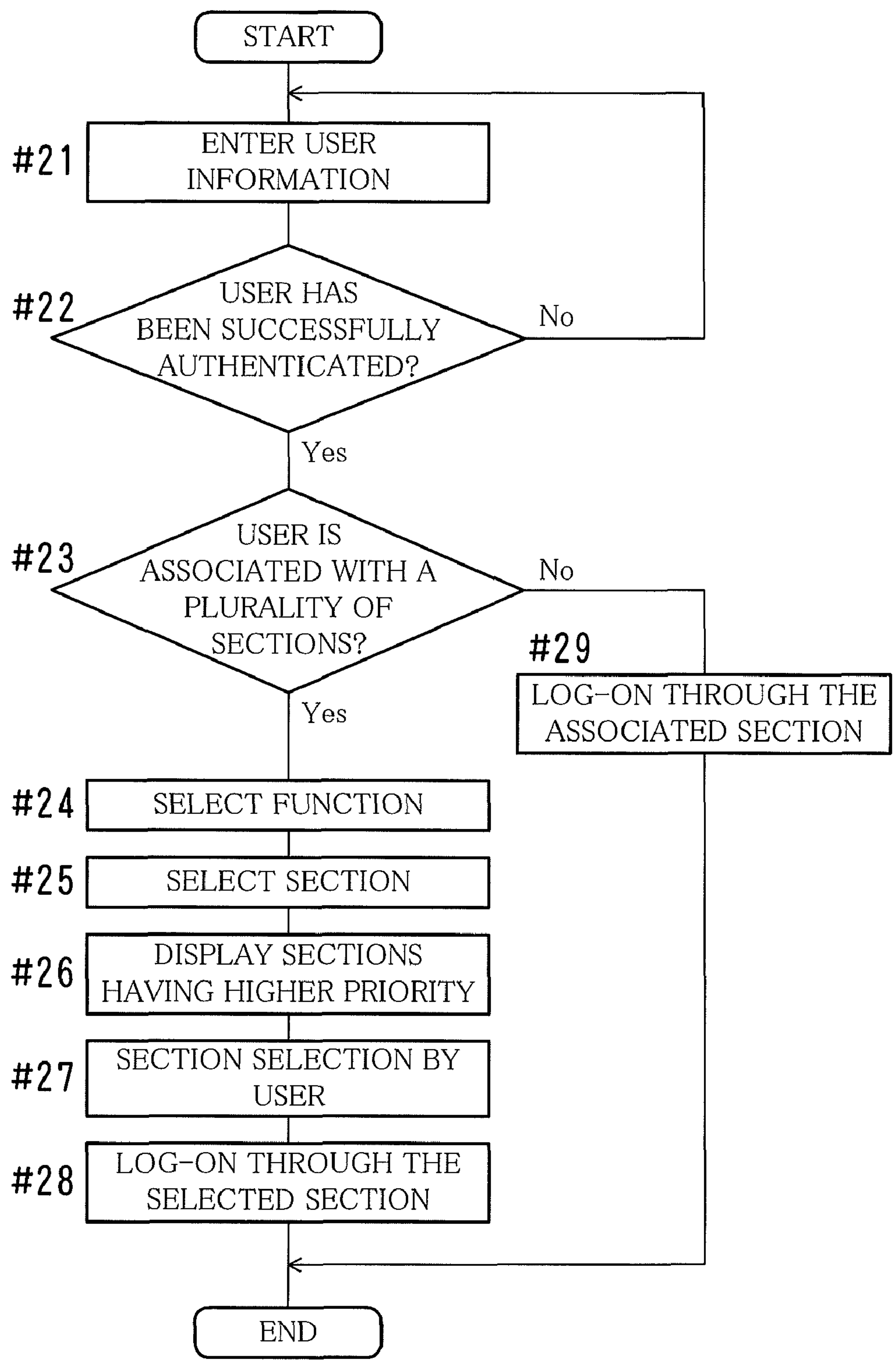
FIG. 21 is a flowchart illustrating an example of a process for logging onto an image forming apparatus.

FIG. 21 is a flowchart illustrating an example of a case in which the setting "display sections having higher priorities" is made as the condition.

Referring to FIG. 21, if a user is successfully authenticated (Yes in #22), and the user is associated with only one section BNJ (No in #23), then he/she logs onto the image forming apparatus 1 through the section BNJ (#29).

If the user is associated with a plurality of sections BNJ (Yes in #23), and the user selects a function (#24), then the section selection process portion 43 performs a process for selecting sections BNJ depending on the selected function (#25). If setting has been performed in such a manner that sections BNJ having higher priorities are displayed, then such sections BNJ are displayed (#26). The user selects one section BNJ from among the sections BNJ displayed (#27); thereby cooperative section authentication is performed, and the user logs onto the image forming apparatus 1 through the selected section BNJ (#28).

Figure 22:
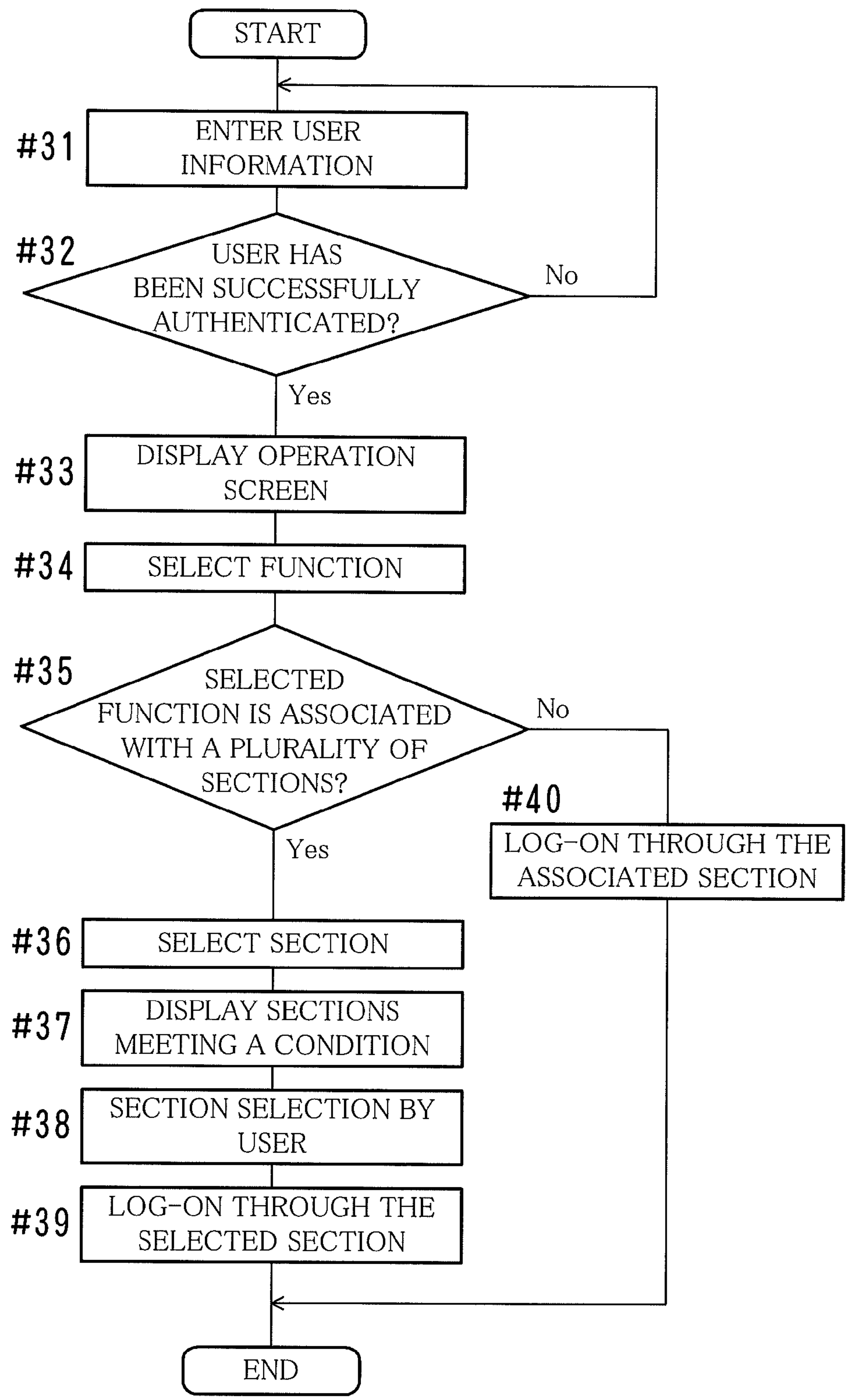
FIG. 22 is a flowchart illustrating an example of a process for logging onto an image forming apparatus.

FIG. 22 is a flowchart illustrating an example of a case in which the operation screen GM2 is displayed after performing user authentication.

Referring to FIG. 22, if a user is successfully authenticated (Yes in #32), then the operation screen GM2 is displayed (#33). If the user performs operation on the operation screen GM2 to select a function KN (#34), and the selected function KN is associated with a plurality of sections BNJ (Yes in #35), then the section selection process portion 43 performs a process for selecting section(s) BNJ (#36). Then, section(s) BNJ satisfying the condition are displayed (#37).

If a plurality of sections BNJ are displayed, the user selects a desired section BNJ (#38) from among the sections BNJ (#38); thereby cooperative section authentication is performed, and the user logs onto the image forming apparatus 1 through the selected section BNJ (#39).

The below description focuses on characteristic processes depicted in the individual flowcharts.

Figure 23:
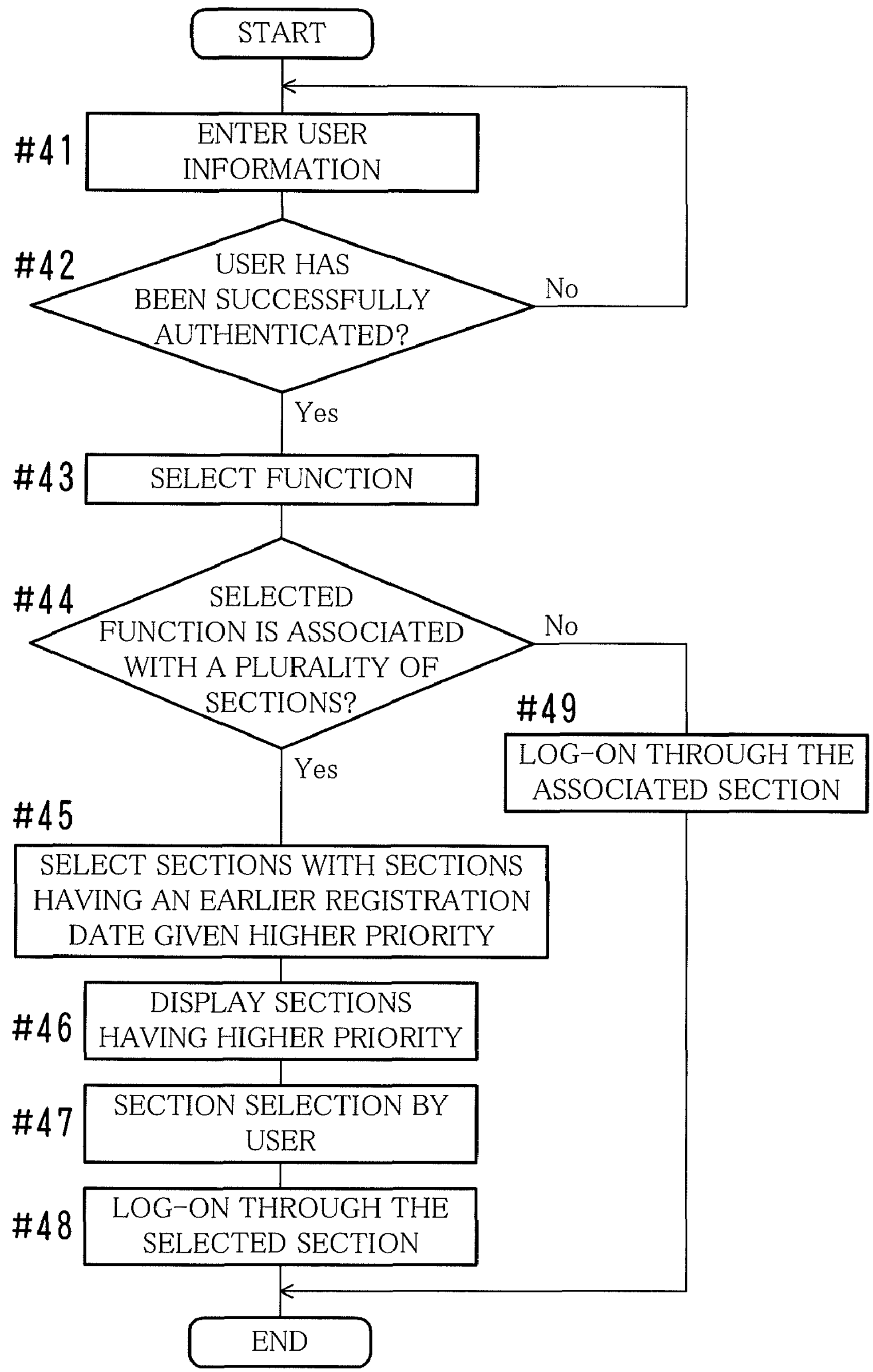
FIG. 23 is a flowchart illustrating an example of a process for logging onto an image forming apparatus.

FIG. 23 is a flowchart illustrating an example of a case in which sections BNJ having an earlier registration date TRB are given higher priorities.

In FIG. 23, a comparison is made between a registration date TRB of a section BNJ recorded in the associated information HJ and registration dates TRB of the other sections BNJ recorded therein. Then, sections BNJ having an earlier registration date TRB are selected as sections BNJ having higher priorities (#45). The sections BNJ selected are displayed in the chronological order of the registration dates TRB (#46).

Assuming that, for example, a user A belongs to an existing section 1, and a new section 2 is registered for launching a new project. In such a case, the existing (old) section 1 is selected instead of the new section 2, because the new project itself has not yet been officially operated. Such selection can prevent the convenience of the user A from being reduced.

Figure 24:
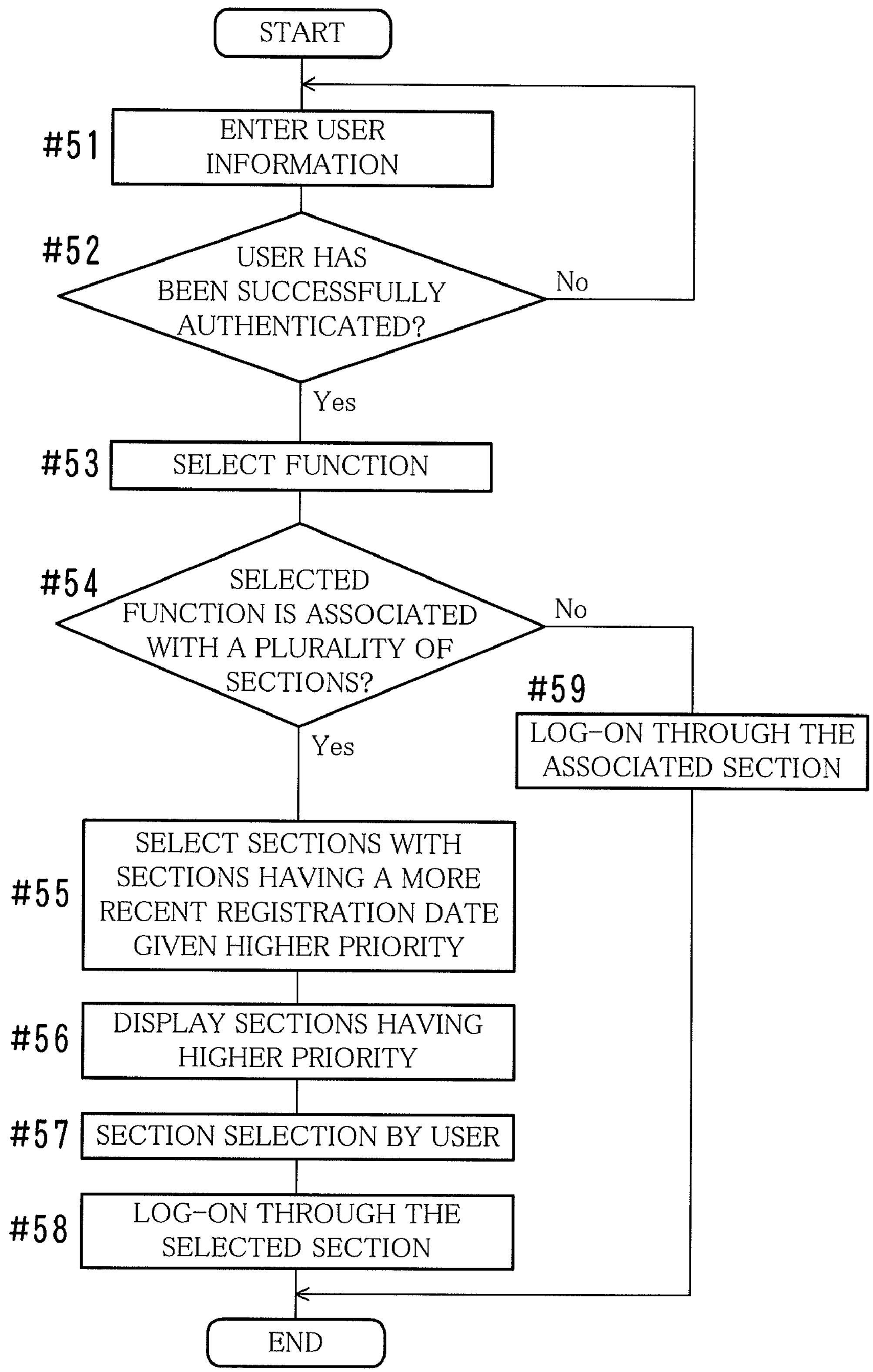
FIG. 24 is a flowchart illustrating an example of a process for logging onto an image forming apparatus.

FIG. 24 is a flowchart illustrating an example of a case in which sections BNJ having a more recent registration date TRB are given higher priorities.

In FIG. 24, a comparison is made between a registration date TRB of a section BNJ recorded in the associated information HJ and registration dates TRB of the other sections BNJ recorded therein. Then, sections BNJ having a more recent registration date TRB are selected as sections BNJ having higher priorities (#55). The sections BNJ selected are displayed in the reverse chronological order of the registration dates TRB (#56).

Assuming that, for example, a user B belongs to both an old section 1 where only market follow-up remains to be performed and a new section 2 having an ongoing job. In such a case, the new section 2 is selected instead of the old section 1, because the job operated under the new section 2 is the main job for the user B. Such selection increases the convenience of the user B.

Figure 25:
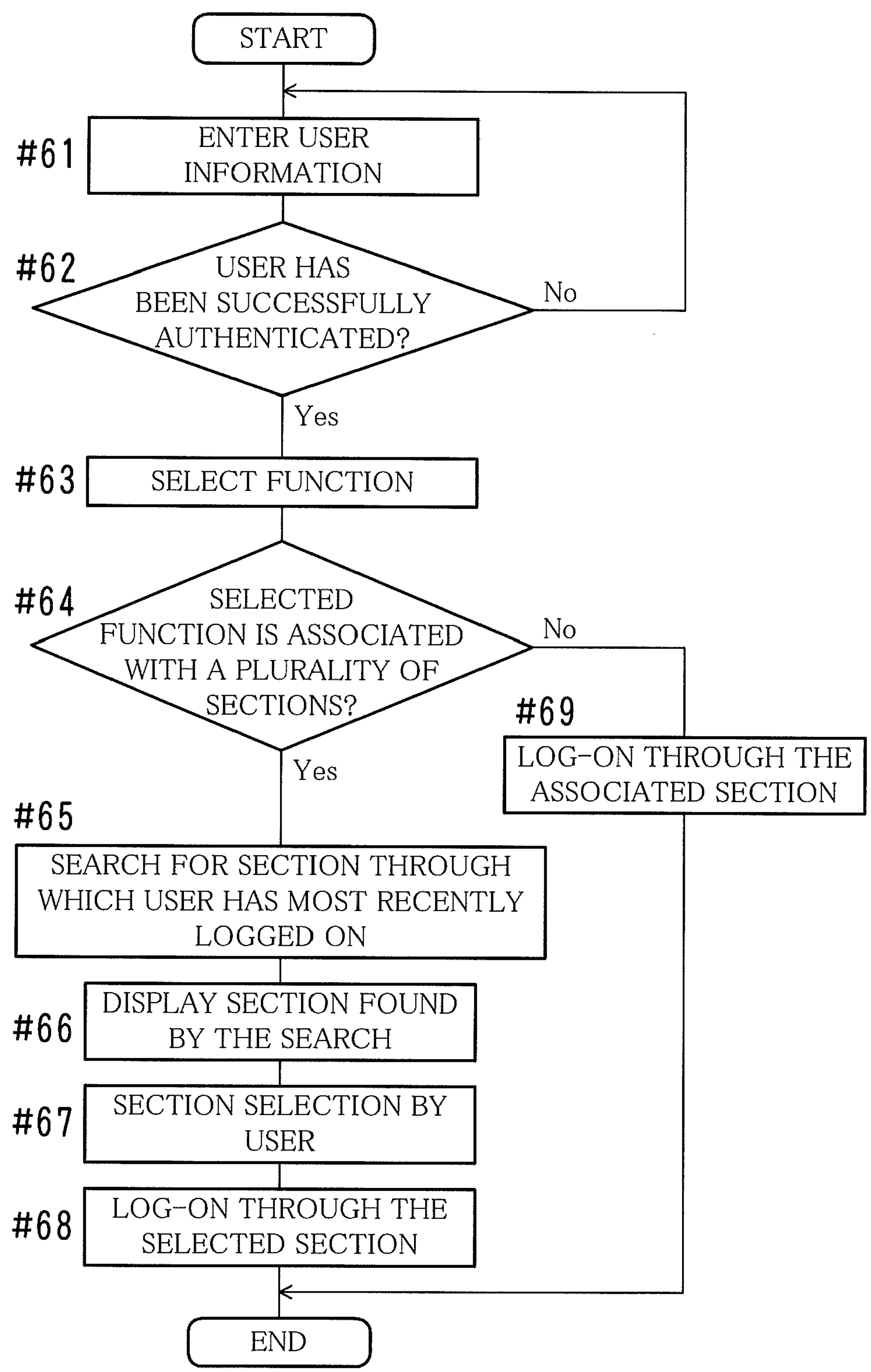
FIG. 25 is a flowchart illustrating an example of a process for logging onto an image forming apparatus.

FIG. 25 is a flowchart illustrating an example of a case of selecting a section BNJ through which a user has most recently logged onto the image forming apparatus 1.

In FIG. 25, a comparison is made, with reference to the log-on history LR, between the date and time at which the user has logged onto or logged out from the image forming apparatus 1 through a section BNJ recorded in the associated information HJ and such date and time through the other sections BNJ recorded therein. Then, a section BNJ through which the user has most recently logged onto or logged out from the image forming apparatus 1 is selected as the section BNJ having the top priority (#65). The section BNJ selected is displayed (#66).

Figure 26:
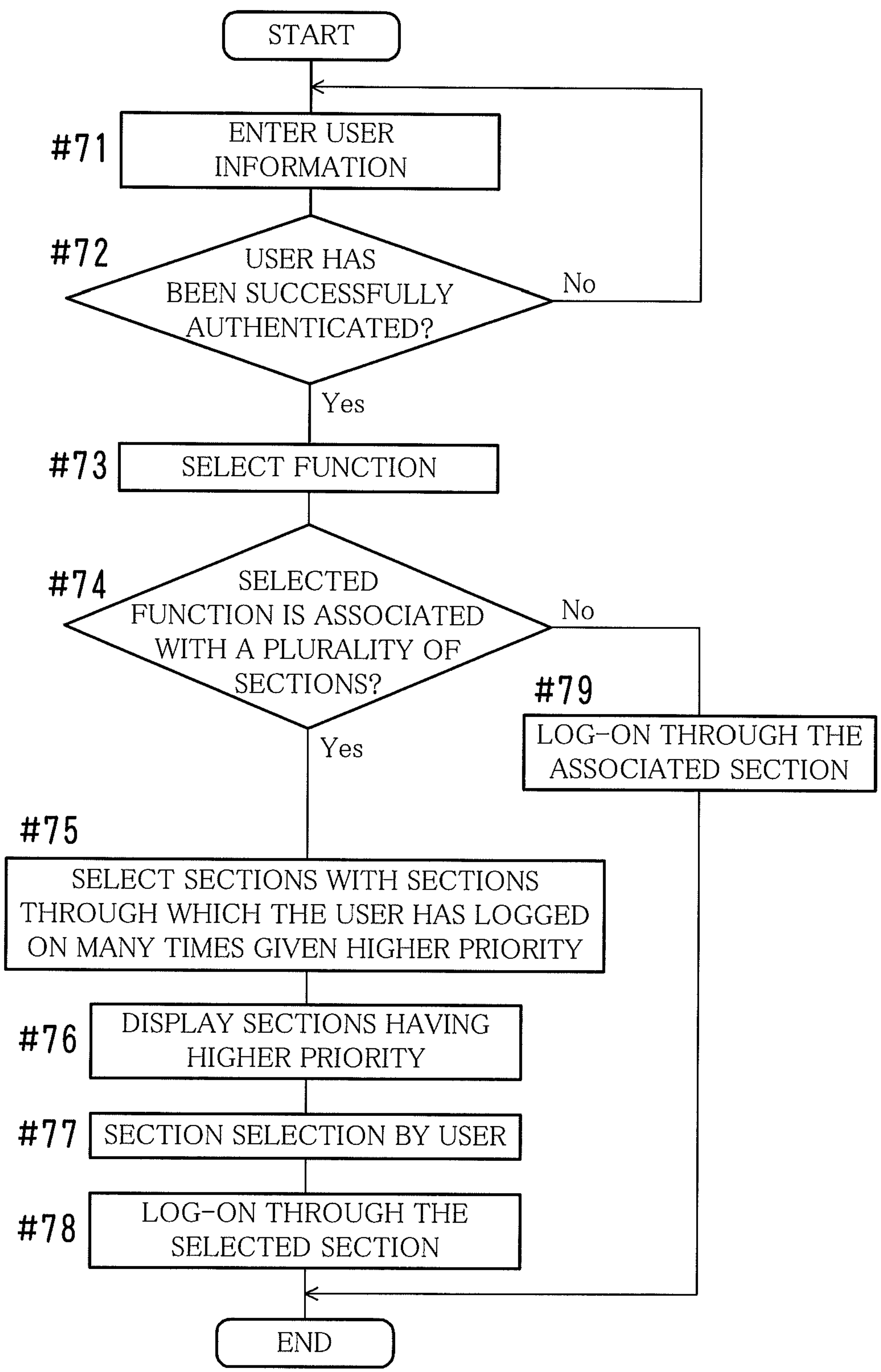
FIG. 26 is a flowchart illustrating an example of a process for logging onto an image forming apparatus.

FIG. 26 is a flowchart illustrating an example of a case of selecting sections BNJ through which a user has logged onto the image forming apparatus 1 many times.

In FIG. 26, a comparison is made, with reference to the log-on history LR, between the number of times of log-on through a section BNJ recorded in the associated information HJ and the number of times of log-on through the other sections BNJ recorded therein. Then, sections BNJ through which the user has logged onto the image forming apparatus 1 many times are selected as sections BNJ having higher priorities (#75). The sections BNJ selected are displayed (#76).

It is also possible to set history information to be used. For example, setting may be so performed that, if the amount of time between the last operation on the image forming apparatus 1 and the log-on operation thereon this time falls within a predetermined amount of time, then a section through which a user has most recently logged thereonto is given the highest priority.

Figure 27:
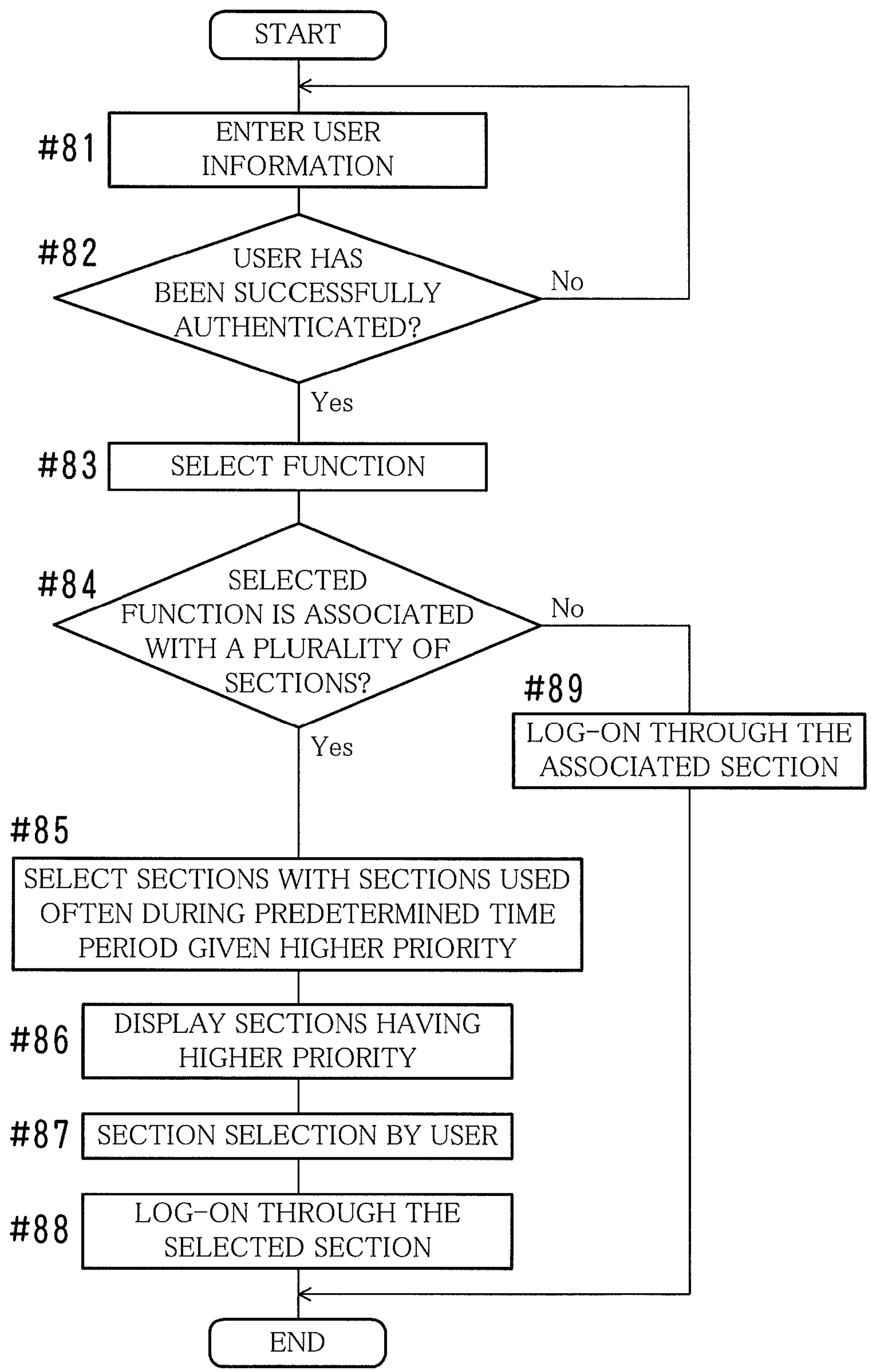
FIG. 27 is a flowchart illustrating an example of a process for logging onto an image forming apparatus.

FIG. 27 is a flowchart illustrating an example of a case of selecting a section BNJ based on when a user is to log onto the image forming apparatus 1.

In FIG. 27, as for sections BNJ recorded in the associated information HJ, a section BNJ highly linked to a time at which the user intends to log onto the image forming apparatus 1, e.g., date, time, month, a day of the week, is supposed to be given a higher priority (#85). Here, "a section highly linked to the time" means that the image forming apparatus 1 is supposed to be used often through that section during the time. It is determined, for example, that, during an accounting period such as the end of a month, general affairs sections, accounting sections, or the like are given higher priorities. Then, such sections BNJ are displayed (#86).

As for the relationship between the time and a section, a relationship table indicating the relationship therebetween is preferably created. Such a relationship table registers therein the time highly linked to each section. Such a relationship table further registers therein, for a variety of projects, the time highly linked to each project and a correlation between a project and a section.

Figure 28:
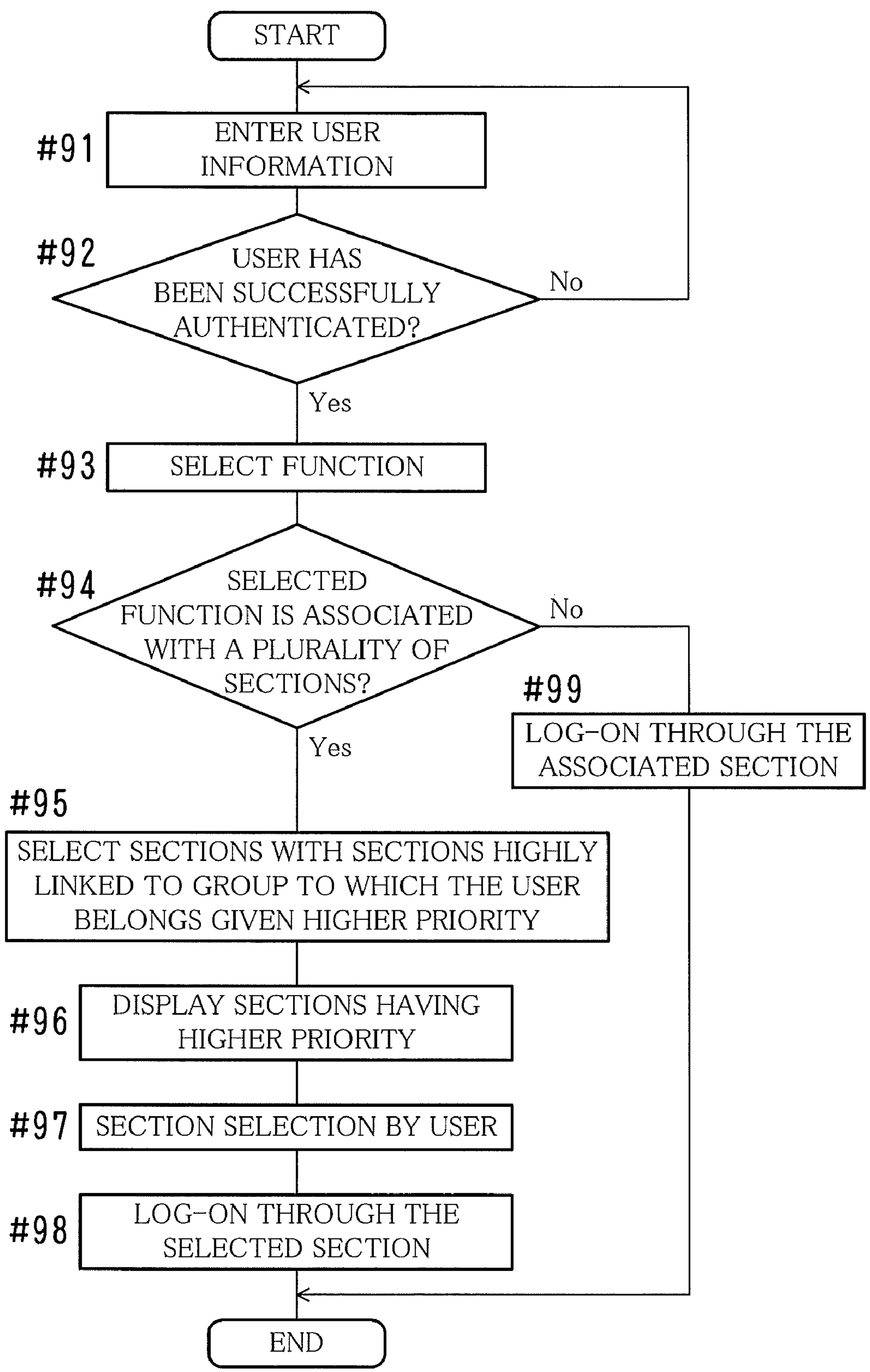
FIG. 28 is a flowchart illustrating an example of a process for logging onto an image forming apparatus.

FIG. 28 is a flowchart illustrating an example of a case of selecting a section BNJ based on a group to which a user belongs.

In FIG. 28, as for sections BNJ recorded in the associated information HJ, a section BNJ highly linked to a group to which a user belongs is determined to be given a higher priority (#95). Assuming that, for example, a user A belongs to a section 1 and a section 2, and the number of members of a group X to which the user A belongs is larger in the section 1 than in the section 2. In such a case, a determination is made such that, as for the user A, the section 1 is to be given a higher priority compared to the section 2. Then, a section BNJ for which a determination has been made to give a higher priority is displayed (#96).

Figure 29:
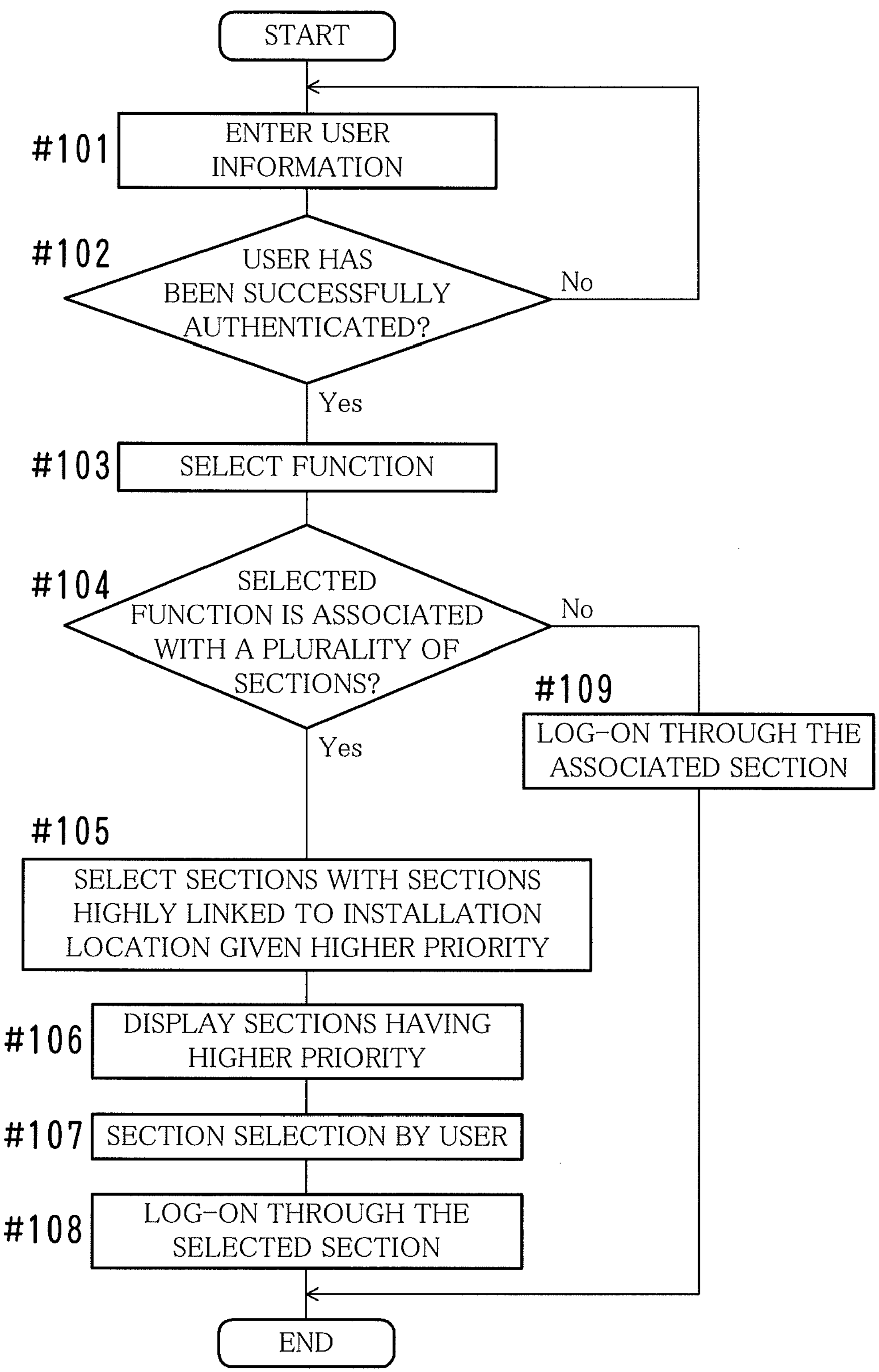
FIG. 29 is a flowchart illustrating an example of a process for logging onto an image forming apparatus.

FIG. 29 is a flowchart illustrating an example of a case of selecting a section BNJ based on a place at which a user performs a log-on operation.

In FIG. 29, as for sections BNJ recorded in the associated information HJ, a section BNJ highly linked to a place at which the user intends to perform a log-on operation is determined to be given a higher priority (#105).

In the case where, for example, the substance of work is different depending on which floor of a building a section BNJ is located on, a location where the image forming apparatus 1 is installed, i.e., a location where the user performs a log-on operation, is determined.

Figure 30:
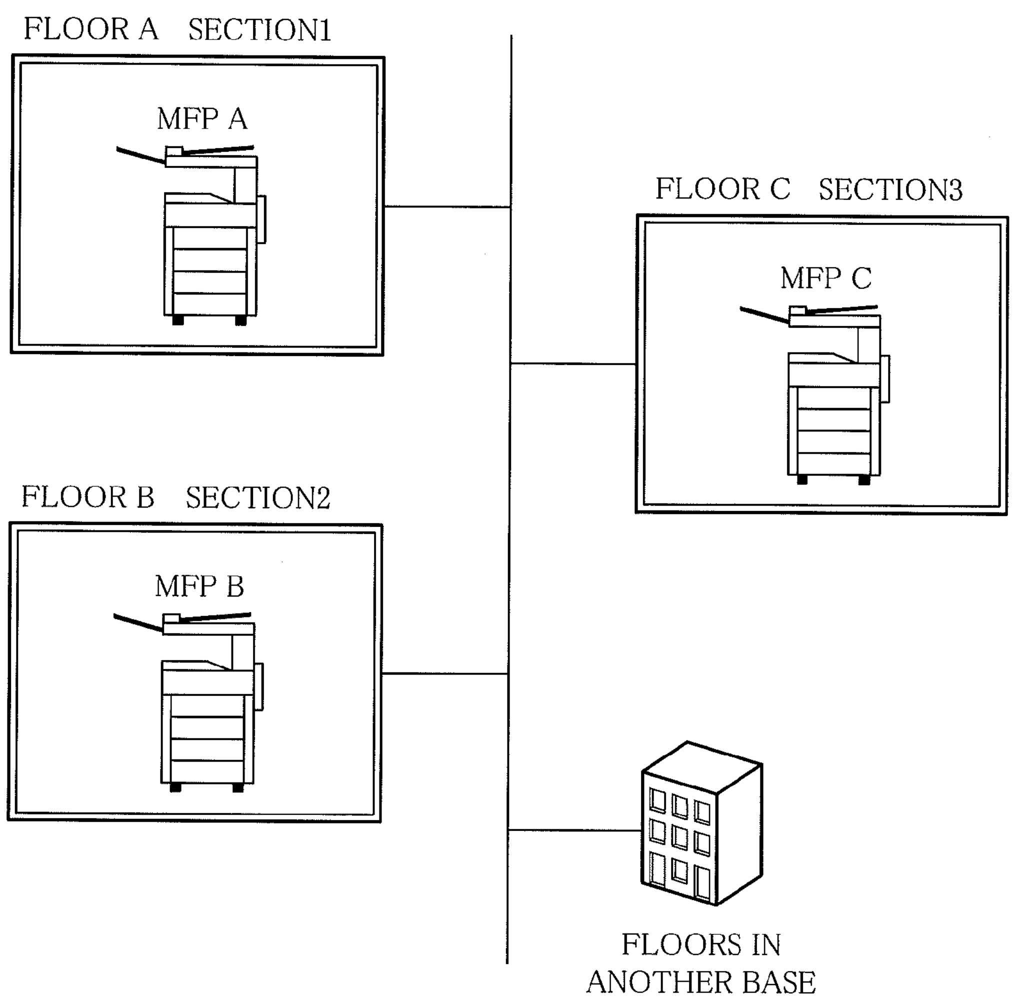
FIG. 30 is a diagram depicting relations between installation locations of image forming apparatuses and sections.

Referring to FIG. 30, if the user performs operation on the image forming apparatus 1 on a floor A, it means that the user is on the floor A. This can be said that the user works on the floor A; thereby, a determination is made such that, as for the user, the section 1 linked to the floor A has a higher priority compared to the other sections. Then, the section BNJ for which the determination has been made to give a higher priority is displayed (#106).

In such a case, a determination is made by entering, in the image forming apparatus 1, the installation location thereof and a section managed on the floor corresponding to the installation location. Alternatively, a determination is so made that a section with which many members on the floor are associated is a section linked to the floor.

The embodiments discussed above include selecting a section BNJ meeting a preset condition from among sections BNJ associated with users and functions KN. Thus, a section BNJ is selected easily and appropriately even if a user belongs to many sections, which facilitates operation for performing section authentication on a user.

In the embodiments described above, the user authentication portion 41 corresponds to a "first authentication portion" or a "user authentication portion" according to the present invention, and the section authentication portion 42 corresponds to a "second authentication portion" or a "section authentication portion" according to the present invention. The associated information storage portion 48 corresponds to an "associated information storage portion" of the present invention. The section selection process portion 43 corresponds to a "selection process portion" of the present invention.

In the embodiment discussed above, the overall configurations and functions of the network system NS, the image forming apparatus 1, and the authentication process portion NN, the configurations and functions of various portions thereof, the details of the screens, the structure of the various types of information, the content to be processed, the processing order, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus comprising:

a user authentication portion that performs a user authentication process on a user by using user authentication information;

an associated information storage portion that stores, therein, associated information in which the user authentication information is associated with a plurality of pieces of section authentication information;

a selection process portion that selects, after the user has been successfully authenticated by the user authentication portion, at least one of the plurality of pieces of section authentication information satisfying a preset condition from among the plurality of pieces of section authentication information associated with the user authentication information that has been used for the user authentication process; and a section authentication portion that performs a section authentication process on the user who has been successfully authenticated by the user authentication portion so that the user is logged onto the image forming apparatus through one of the at least one of the pieces of section authentication information selected by the selection process portion.

2. The image forming apparatus according to claim 1, further comprising a display control portion that controls a display portion, wherein when the user is successfully authenticated by the user authentication portion, the display control portion controls the display portion to display an operation screen through which the user operates the image forming apparatus, and when the user successfully authenticated by the user authentication portion specifies a function to be executed by the image forming apparatus on the operation screen, the selection process portion selects at least one of the plurality of pieces of section authentication information for the function specified by the user.

3. The image forming apparatus according to claim 1, further comprising a default function setting portion that selects and sets a default function from among functions available in the image forming apparatus, wherein the selection process portion selects at least one of the plurality of pieces of section authentication information for the default function.

4. The image forming apparatus according to claim 1, further comprising a display control portion that controls a display portion, a default function setting portion that selects and sets a default function from among functions available in the image forming apparatus, and a first setting portion that selects and sets, in advance, any one of the following:

causing the selection process portion to select at least one of the plurality of pieces of section authentication information for the default function when the user is successfully authenticated by the user authentication portion; and causing the display control portion to control the display portion to display an operation screen through which the image forming apparatus is operated when the user is successfully authenticated by the user authentication portion.

5. The image forming apparatus according to claim 1, further comprising a second setting portion that selects and sets, in advance, any one of the following:

causing the selection process portion to select at least one of the plurality of pieces of section authentication information every time when a function to be executed by the image forming apparatus is changed to another function; and causing the selection process portion to select at least one of the plurality of pieces of section authentication information only for a function that is selected for the first time.

6. The image forming apparatus according to claim 1, further comprising a log-on history storage portion that records, therein, a log-on history, the log-on history being a record for the user to have logged onto the image forming apparatus through the user authentication process and the section authentication process, wherein the selection process portion refers to the log-on history recorded in the log-on history storage portion, and selects, as the section authentication information satisfying the preset condition, at least one of the plurality of pieces of section authentication information corresponding to a section through which the user successfully authenticated by the user authentication portion has logged onto the image forming apparatus many times.

7. The image forming apparatus according to claim 1, further comprising a log-on history storage portion that records, therein, a log-on history, the log-on history being a record for the user to have logged onto the image forming apparatus through the user authentication process and the section authentication process, wherein the selection process portion refers to the log-on history recorded in the log-on history storage portion, and selects, as the section authentication information satisfying the preset condition, one of the plurality of pieces of section authentication information corresponding to a section through which the user successfully authenticated by the user authentication portion has logged onto the image forming apparatus most recently.

8. A non-transitory computer-readable storage medium storing thereon a computer program used in a computer provided in an image forming apparatus for performing an image-related process, the computer program causing the image forming apparatus to implement:

a user authentication portion that performs a user authentication process on a user by using user authentication information;

an associated information storage portion that stores, therein, associated information in which the user authentication information is associated with a plurality of pieces of section authentication information;

a selection process portion that selects, after the user has been successfully authenticated by the user authentication portion, at least one of the plurality of pieces of section authentication information satisfying a preset condition from among the plurality of pieces of section authentication information associated with the user authentication information that has been used for the user authentication process; and a section authentication portion that performs a section authentication process on the user who has been successfully authenticated by the user authentication portion so that the user is logged onto the image forming apparatus through one of the at least one of the pieces of section authentication information selected by the selection process portion.

9. The non-transitory computer-readable storage medium according to claim 8, wherein the computer program causes the image forming apparatus to further implement a display control portion that controls a display portion provided in the image forming apparatus to display an operation screen through which the user operates the image forming apparatus when the user is successfully authenticated by the user authentication portion, and when the user successfully authenticated by the user authentication portion specifies a function to be executed by the image forming apparatus on the operation screen, the selection process portion selects at least one of the plurality of pieces of section authentication information for the function specified by the user.

10. The non-transitory computer-readable storage medium according to claim 8, wherein the computer program causes the image forming apparatus to further implement a default function setting portion that selects and sets a default function from among functions available in the image forming apparatus, and the selection process portion selects at least one of the plurality of pieces of section authentication information for the default function.

11. The non-transitory computer-readable storage medium according to claim 8, wherein the computer program causes the image forming apparatus to further implement a default function setting portion that selects and sets a default function from among functions available in the image forming apparatus, and a first setting portion that selects and sets, in advance, any one of the following:

causing the selection process portion to select at least one of the plurality of pieces of section authentication information for the default function when the user is successfully authenticated by the user authentication portion; and causing a display portion provided in the image forming apparatus to display an operation screen through which the image forming apparatus is operated when the user is successfully authenticated by the user authentication portion.

12. The non-transitory computer-readable storage medium according to claim 8, wherein the computer program causes the image forming apparatus to further implement a second setting portion that selects and sets, in advance, any one of the following:

causing the selection process portion to select at least one of the plurality of pieces of section authentication information every time when a function to be executed by the image forming apparatus is changed to another function; and causing the selection process portion to select at least one of the plurality of pieces of section authentication information only for a function that is selected for the first time.

13. The non-transitory computer-readable storage medium according to claim 8, wherein the computer program causes the image forming apparatus to further implement a log-on history storage portion that records, therein, a log-on history, the log-on history being a record for the user to have logged onto the image forming apparatus through the user authentication process and the section authentication process, and the selection process portion refers to the log-on history recorded in the log-on history storage portion, and selects, as the section authentication information satisfying the preset condition, at least one of the plurality of pieces of section authentication information corresponding to a section through which the user successfully authenticated by the user authentication portion has logged onto the image forming apparatus many times.

14. The non-transitory computer-readable storage medium according to claim 8, wherein the computer program causes the image forming apparatus to further implement a log-on history storage portion that records, therein, a log-on history, the log-on history being a record for the user to have logged onto the image forming apparatus through the user authentication process and the section authentication process, and the selection process portion refers to the log-on history recorded in the log-on history storage portion, and selects, as the section authentication information satisfying the preset condition, one of the plurality of pieces of section authentication information corresponding to a section through which the user successfully authenticated by the user authentication portion has logged onto the image forming apparatus most recently.

15. A method for performing an image-related process in an image forming apparatus, the method comprising:

a first step of performing a user authentication process on a user by using user authentication information;

a second step of storing, therein, associated information in which the user authentication information is associated with a plurality of pieces of section authentication information;

a third step of selecting, after the user has been successfully authenticated in the first step, at least one of the plurality of pieces of section authentication information satisfying a preset condition from among the plurality of pieces of section authentication information associated with the user authentication information that has been used for the user authentication process; and a fourth step of performing a section authentication process on the user who has been successfully authenticated in the first step so that the user is logged onto the image forming apparatus through one of the at least one of the pieces of section authentication information selected in the third step.

16. The method according to claim 15, further comprising a fifth step of displaying, on a display portion provided in the image forming apparatus, an operation screen through which the user operates the image forming apparatus when the user is successfully authenticated in the first step, wherein the third step includes, when the user successfully authenticated in the first step specifies a function to be executed by the image forming apparatus on the operation screen, selecting at least one of the plurality of pieces of section authentication information for the function specified by the user.

17. The method according to claim 15, further comprising a sixth step of selecting and setting a default function from among functions available in the image forming apparatus, wherein the third step includes selecting at least one of the plurality of pieces of section authentication information for the default function.

18. The method according to claim 15, further comprising a sixth step of selecting and setting a default function from among functions available in the image forming apparatus, and a seventh step of selecting and setting, in advance, any one of the following:

selecting, in the third step, at least one of the plurality of pieces of section authentication information for the default function when the user is successfully authenticated in the first step; and causing a display portion provided in the image forming apparatus to display an operation screen through which the image forming apparatus is operated when the user is successfully authenticated in the first step.

19. The method according to claim 15, further comprising an eighth step of selecting and setting, in advance, any one of the following:

selecting, in the third step, at least one of the plurality of pieces of section authentication information every time when a function to be executed by the image forming apparatus is changed to another function; and selecting, in the third step, at least one of the plurality of pieces of section authentication information only for a function that is selected for the first time.

20. The method according to claim 15, further comprising a ninth step of recording a log-on history, the log-on history being a record for the user to have logged onto the image forming apparatus through the user authentication process and the section authentication process, wherein the third step includes referring to the log-on history recorded in the ninth step, and selecting, as the section authentication information satisfying the preset condition, at least one of the plurality of pieces of section authentication information corresponding to a section through which the user successfully authenticated in the first step has logged onto the image forming apparatus many times.

21. The method according to claim 15, further comprising a ninth step of recording a log-on history, the log-on history being a record for the user to have logged onto the image forming apparatus through the user authentication process and the section authentication process, wherein the third step includes referring to the log-on history recorded in the ninth step, and selecting, as the section authentication information satisfying the preset condition, one of the plurality of pieces of section authentication information corresponding to a section through which the user successfully authenticated in the first step has logged onto the image forming apparatus most recently.

22. The image forming apparatus according to claim 1, wherein the authenticated user specifies the one of the at least one of the pieces of section authentication information selected by the selection process portion to be used in the section authentication process.

23. The non-transitory computer-readable storage medium according to claim 8, wherein the authenticated user specifies the one of the at least one of the pieces of section authentication information selected by the selection process portion to be used in the section authentication process.

24. The method according to claim 15, wherein the authenticated user specifies the one of the at least one of the pieces of section authentication information selected in the third step to be used in the section authentication process.

* * * * *